US010512321B2

(12) United States Patent
McArthur et al.

(10) Patent No.: US 10,512,321 B2
(45) Date of Patent: Dec. 24, 2019

(54) METHODS, SYSTEMS AND INSTRUMENTS FOR CREATING PARTIAL MODEL OF A HEAD FOR USE IN HAIR TRANSPLANTATION

(71) Applicant: Restoration Robotics, Inc., San Jose, CA (US)

(72) Inventors: Franklin T. McArthur, Santa Clara, CA (US); Gabriele Zingaretti, Felton, CA (US); Ognjen Petrovic, San Jose, CA (US)

(73) Assignee: Restoration Robotics, Inc., San Jose, CA (US)

( * ) Notice: Subject to any disclaimer, the term of this patent is extended or adjusted under 35 U.S.C. 154(b) by 262 days.

(21) Appl. No.: 15/252,766

(22) Filed: Aug. 31, 2016

(65) Prior Publication Data

US 2017/0065061 A1 Mar. 9, 2017

Related U.S. Application Data

(60) Provisional application No. 62/214,594, filed on Sep. 4, 2015.

(51) Int. Cl.
*G06K 9/40* (2006.01)
*A45D 44/14* (2006.01)
(Continued)

(52) U.S. Cl.
CPC ......... *A45D 44/14* (2013.01); *G06K 9/00362* (2013.01); *G06K 9/4604* (2013.01);
(Continued)

(58) Field of Classification Search
CPC .. A45D 44/14; G06K 9/00362; G06K 9/4604; G06K 9/52; G06T 3/20;
(Continued)

(56) References Cited

U.S. PATENT DOCUMENTS

| | | | |
|---|---|---|---|
| 6,434,278 B1 * | 8/2002 | Hashimoto | ............ G06T 17/00 345/583 |
| 6,585,746 B2 | 7/2003 | Gildenberg | |

(Continued)

FOREIGN PATENT DOCUMENTS

| | | |
|---|---|---|
| JP | 2014178173 A | 9/2014 |
| WO | 2006131922 A2 | 12/2006 |
| WO | 2015120479 A1 | 8/2015 |

OTHER PUBLICATIONS

"Human Head" <https://en.wikipedia.org/wiki/Human_head> as archived by the Internet Archive Project <http://archive.org/web/web.php> on Aug. 19, 2015 (Year: 2015).*

(Continued)

*Primary Examiner* — Jason D Mitchell

(57) ABSTRACT

The present disclosure provides for methods, systems and instruments for creating a partial model of a head for use in planning or tracking a procedure, such as hair transplantation. The methodology allows for an accurate 3D representation to be quickly and efficiently generated of an identified portion of the head, not the entire head, from two or more 2D images, such as still images. According to the methodology of the present disclosure a 3D dome representation of the top portion of the head of a subject may be created based on the data extracted from one or more 2D images and/or a certain determined height dimension.

27 Claims, 12 Drawing Sheets

(51) Int. Cl.
*G06K 9/00* (2006.01)
*G06K 9/46* (2006.01)
*G06K 9/52* (2006.01)
*G06T 3/20* (2006.01)
*G06T 7/60* (2017.01)
*G06T 15/20* (2011.01)
*G06T 17/00* (2006.01)
*G06T 15/04* (2011.01)

(52) U.S. Cl.
CPC .............. *G06K 9/52* (2013.01); *G06T 3/20* (2013.01); *G06T 7/60* (2013.01); *G06T 15/04* (2013.01); *G06T 15/20* (2013.01); *G06T 17/00* (2013.01); *G06T 2200/04* (2013.01); *G06T 2207/30196* (2013.01)

(58) Field of Classification Search
CPC .......... G06T 7/60; G06T 15/04; G06T 15/20; G06T 17/00; G06T 2200/04; G06T 2207/30; G06T 2207/196
USPC .......................................................... 700/98
See application file for complete search history.

(56) References Cited

U.S. PATENT DOCUMENTS

| | | | |
|---|---|---|---|
| 7,289,662 B2 | 10/2007 | Keaton et al. | |
| 7,646,909 B2 * | 1/2010 | Jiang | G06K 9/00208 345/473 |
| 7,806,121 B2 * | 10/2010 | Bodduluri | G16H 50/50 128/897 |
| 8,104,480 B2 | 1/2012 | Bodduluri | |
| 8,743,124 B2 * | 6/2014 | Audoly | G06T 13/40 345/473 |
| 9,129,438 B2 | 9/2015 | Aarts et al. | |
| 9,202,312 B1 * | 12/2015 | Zingaretti | G06T 19/20 |
| 2005/0031194 A1 * | 2/2005 | Lee | G06K 9/00288 382/154 |
| 2005/0031196 A1 * | 2/2005 | Moghaddam | G06K 9/00288 382/154 |
| 2007/0106306 A1 | 5/2007 | Bodduluri et al. | |
| 2009/0153552 A1 * | 6/2009 | Fidaleo | G06Q 30/02 345/419 |
| 2009/0207171 A1 * | 8/2009 | Feilkas | G06T 7/0089 345/427 |
| 2010/0198564 A1 * | 8/2010 | Tuma | A61B 5/103 703/1 |
| 2013/0124156 A1 * | 5/2013 | Wolper | G06T 17/00 703/1 |
| 2014/0233849 A1 * | 8/2014 | Weng | G06K 9/00281 382/154 |
| 2014/0249662 A1 * | 9/2014 | Pettis | H04N 1/00827 700/98 |
| 2014/0279192 A1 * | 9/2014 | Selby | G06Q 30/06321 705/26.7 |
| 2015/0035945 A1 | 2/2015 | Zhang | |
| 2015/0054825 A1 * | 2/2015 | Weng | G06T 17/00 345/420 |
| 2015/0348230 A1 * | 12/2015 | Sohn | G06T 3/0012 345/660 |
| 2016/0180597 A1 | 6/2016 | Adeyoola et al. | |

OTHER PUBLICATIONS

International Search Report & Written Opinion, PCT/US2016/049635, dated Jan. 25, 2017.
Lee, K. et al.; "3D face modeling from perspective-views and contour-based generic-model", Real-Time Imaging, 2001, vol. 7., No. 2, pp. 173-182.
Zhuang, H. et al.; "A Method for Creating 3D Face from a 2D Face Image", 2006 Florida Conference on Recent Advances in Robotics, FCRAR 2006, Miami, FL, May 25-26, 2006, 7 pgs.
Mohamed, M.A. et al.; "3D Object Reconstruction using single image", IJCSI International Journal of Computer Science Issues, vol. 11, Issue 1, No. 1, Jan. 2014; pp. 45-53.
Hassner, Tal et al.; "Example Based 3D Reconstruction from Single 2D Images"; Proceedings of the 2006 Conference on Computer Vision and Pattern Recognition Workshop; 2006; 8 pages.
"Time-of-flight Camera"; https://en.wikipedia.org/wiki/Time-of-flight_camera, retrieved May 20, 2016; 8 pgs.
"Structured-light 3D scanner"; https://en.wikipedia.org/wiki/Structured-light_3D_scanner, retrieved May 20, 2016; pp. 1-9. 1-12.

* cited by examiner

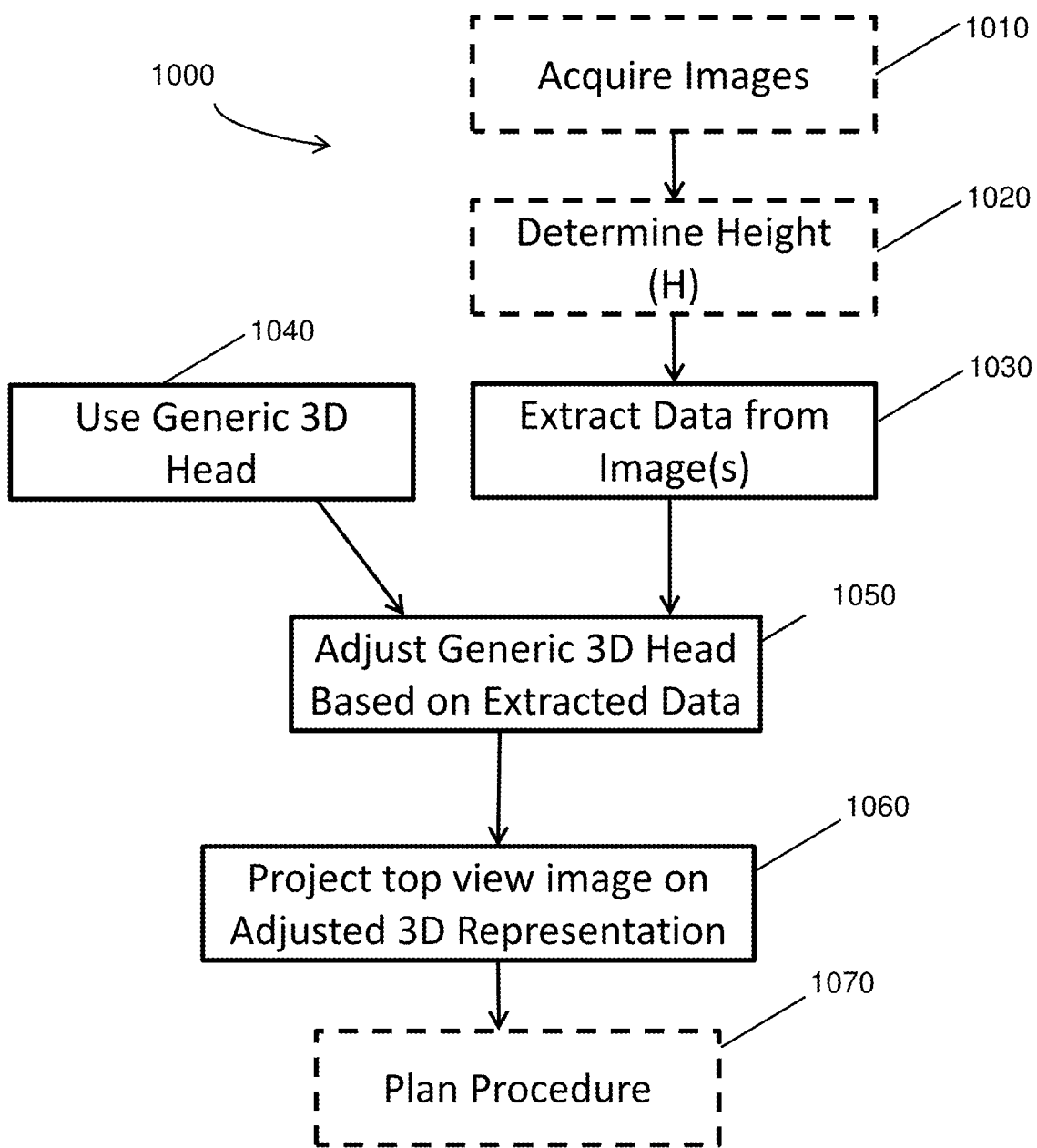

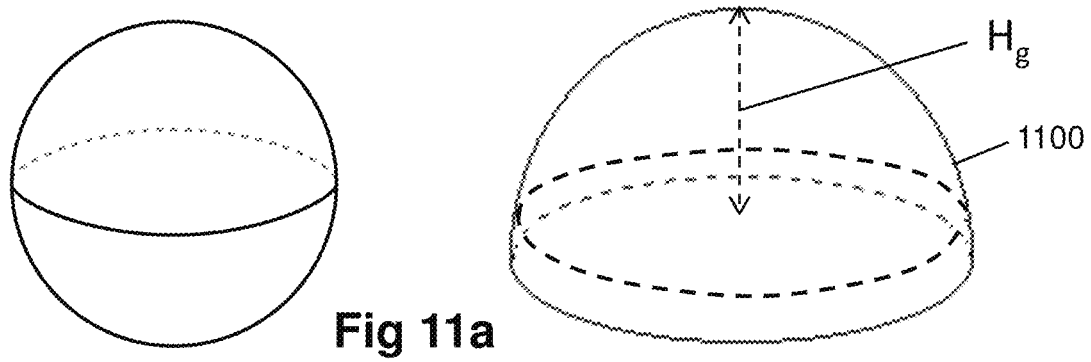
Fig 11a
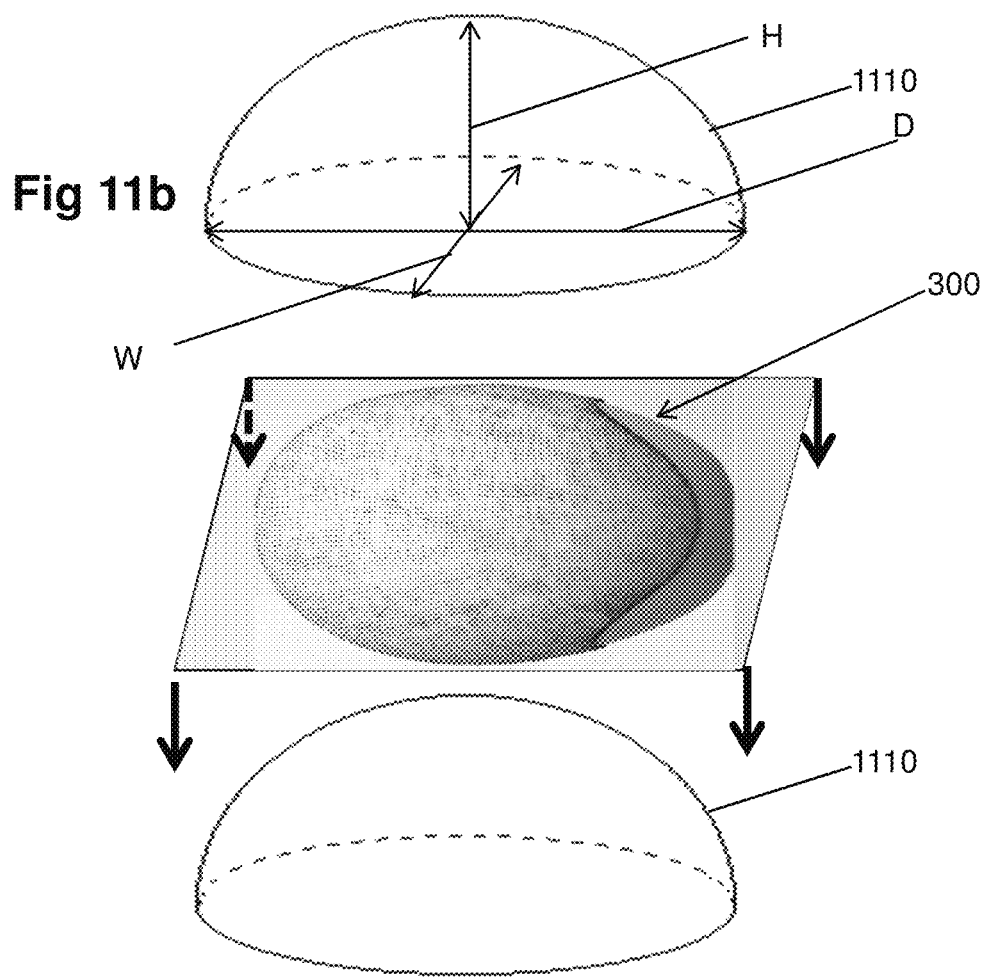
Fig 11b
Fig 11c

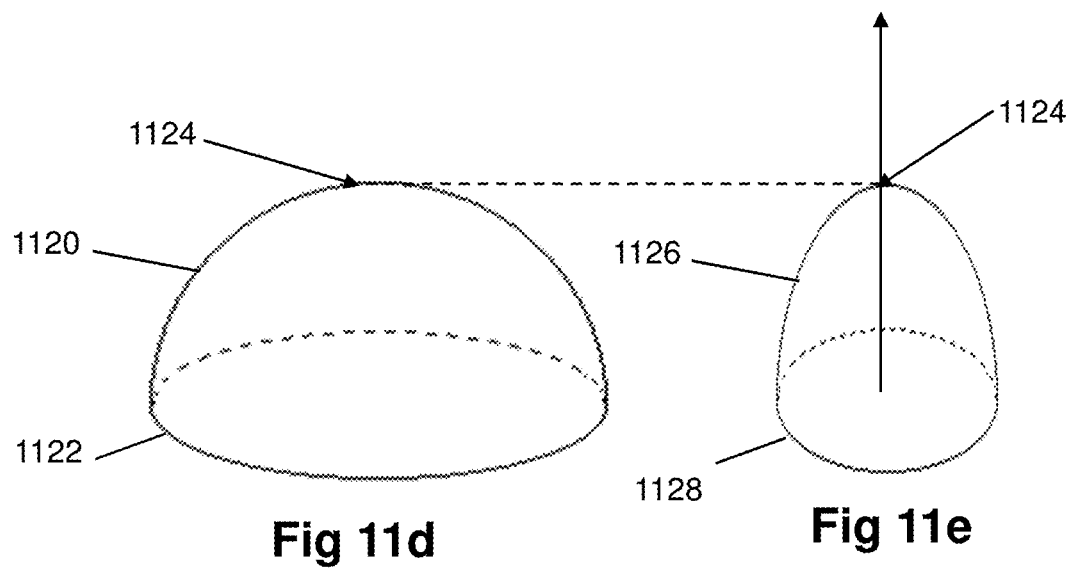
Fig 11d  Fig 11e
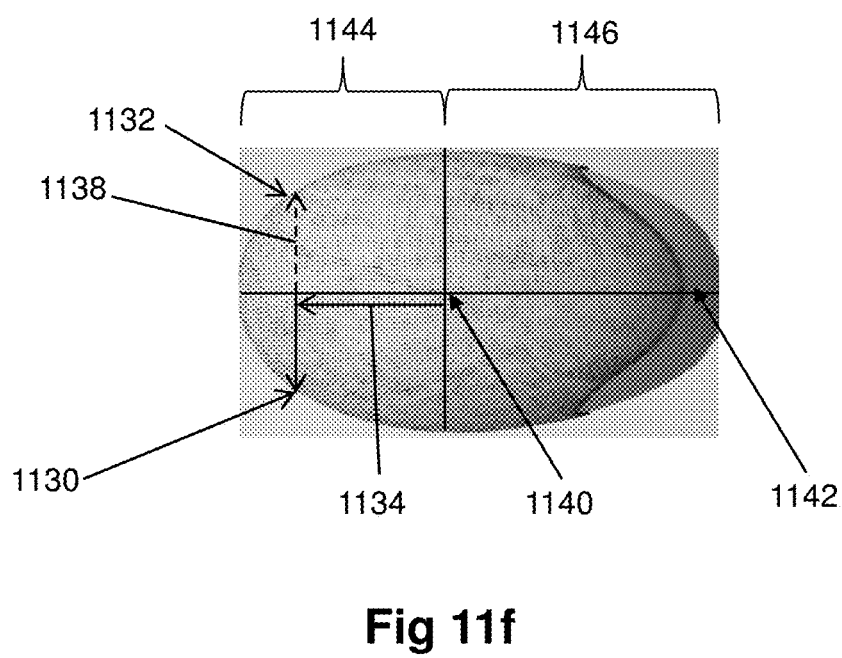
Fig 11f

METHODS, SYSTEMS AND INSTRUMENTS FOR CREATING PARTIAL MODEL OF A HEAD FOR USE IN HAIR TRANSPLANTATION

RELATED APPLICATION DATA

This application claims priority under 35 U.S.C. 119(e) to U.S. Provisional Application No. 62/214,594 filed Sep. 4, 2015, entitled "Methods, Systems and Instruments for Creating Partial Model of a Head for Use in Hair Transplantation".

TECHNICAL FIELD

The present disclosure relates generally to management of medical, cosmetic and dermatological procedures. In particular, this application relates to methods, instruments and systems for creating a 3D model for use in planning and/or performing procedures, including hair transplantation procedures.

BACKGROUND

When planning a medical procedure, for example a hair transplantation procedure, it is beneficial for both the patient and the physician to have a realistic simulation, for example, of the portion of the head where the procedure is intended to be performed as well as the outcome of such procedure.

Various approaches have been proposed for 3D modeling for virtual characters in video games, movies and animations. However, such approaches and techniques are labor intensive, time consuming and not necessarily suitable in other applications, such as hair simulation for medical purposes and other applications. On the other hand, in medical applications, the options available for patients to see a realistic representation of what they may look like once they have a procedure performed, are somewhat limited, particularly in terms of medical treatments and procedures, including those related to hair restoration. Using hair restoration as an example, no matter what type of hair restoration process or hair transplant procedure is adopted, whether it is a chemical or drug application or treatment, or if it is a surgical hair transplantation, such as a strip procedure, a manual follicular unit extraction (FUE) procedure or robotic FUE process, it would aid both the physician and the patient if the patient could be provided with a realistic representation of the area where procedure to be performed and the post-procedure or post-treatment appearance. Simulations of what a patient would look like after a product has been applied or procedure has been performed would not only assist the physician in explaining to their patients what the procedure could offer them and what their "new" head of hair would look like, but would also help the patient decide if the procedure is the right one for them. Therefore, there is a need for continued improvements in hair modeling and simulation methods and systems, especially those useful for hair simulation and rendering in planning medical and cosmetic treatments and procedures.

Commonly assigned U.S. Pat. Nos. 7,806,121 and 8,104,480 (collectively, "Bodduluri") illustrate systems and methods for planning transplantation of follicular units into a body surface of the patient. The entire disclosures of both above-identified U.S. patents are incorporated by reference.

SUMMARY

The present disclosure provides a variety of systems and methods for planning various medical, cosmetic and dermatological procedures, including hair transplantation.

According to one aspect of the present disclosure, a method for generating a 3D representation of a portion of a head is provided. The method may comprise determining a height dimension H from a 2D image of a front or a side of a head of a person, the height dimension H corresponding to a distance from a top of the head in the 2D image to a location approximately at or above a level of an eyebrow; extracting data from the 2D image of the front or the side of the head of the person within the height dimension H and from at least one top view 2D image of the head; and creating a 3D dome representation of the portion of the head based on the height dimension H and the extracted data from the 2D images. The method may also comprise projecting the 2D top view image of the head onto the 3D dome representation of the top portion of the head. The method may be used to facilitate planning and/or performing of a procedure on the portion of the head. The procedure being planned or performed may comprise, for example, a hair transplantation or hair restoration procedure, simulation of hair implantation sites, simulation of hair follicles, or tattooing, including tattooing appearance of the hair in the balding areas.

In some embodiments, the height dimension H may be determined (for example, from the one or more images based on a curvature of the forehead of a person and may exclude any portion right above the eyebrows that has a pronounced curvature or angling. In certain embodiments, for example, the height dimension H may be derived based on one or more locations where an angle between a tangent on a front or a side contour of a top portion of a head and a line substantially parallel to a vertical line is less than a predetermined or threshold angle. Depending on a particular implementation, the predetermined or threshold angle may comprise, for example, an angle in the range of 40-60 degrees. In certain embodiments, the height dimension H may be 25% to 80% of the distance between the top of the head and the eyebrows. In other embodiments the height dimension is less than or equal to 7-8 cm, or is within a range, for example, between 6 cm and 12 cm. In various embodiments, it may be desirable to limit the height H to avoid any anatomical facial features, such as nose, eyes, eyebrows, or any other pronounced curves or sharp directional changes. Further, in various implementations the step of extracting data from the 2D image comprises extracting data or information about a contour of the top 2D image of the head, an open-loop curve of the front 2D image of the head, an open-loop curve of the side 2D image of the head, or any combination of the above. In other implementations, the step of extracting data from the 2D image comprises extracting data or information about one or more dimensions of the respective top view 2D image, the top portion of the front view 2D image or the top portion of the side view 2D image of the head, or any combination of the above.

In some embodiments, creating the 3D dome representation of the top portion of the head may comprise starting with a generic 3D representation of the whole generic head or a portion of the generic head, and then adjusting such generic 3D representation based on the extracted data and, in some embodiments, also on the height H. In certain implementations the generic 3D representation may comprise substantially half a sphere and may be adjusted based on the determined height H, while in other implementations the generic 3D representation from the beginning may be created to represent a portion of the sphere already cut at a predetermined generic height Hg, which may be based on some statistical or historic data for a particular group or type of patients. In some examples the generic 3D representation may be selected, for example, by a user or automatically by the processor from a collection of various templates, the templates representing variations, for example, in gender, age, ethnicity and level of hair loss. Such templates may be stored in memory or otherwise downloaded or accessed by the system used in implementing the methodology of the present disclosure. In various embodiments the adjusting step may comprise one or more of scaling, translating or rotating the generic 3D representation.

According to another aspect of the present disclosure, a method for generating a 3D representation of a top dome portion of a head (for example, for use in planning or performing of a procedure, such as hair restoration) is provided, the method comprising: determining a height dimension (H) from a 2D image of a front or a side of a head of a person, the height dimension H corresponding to a distance from a top of the head in the 2D image to a location at or above a level of an eyebrow; extracting data from the 2D image of the front or the side of the head of the person and from at least one more 2D image of a different view of the head of the person; and adjusting a generic 3D representation of a generic head or at least a top portion of a generic head to create a 3D dome representing a top portion of the head of the person based on: a) the height dimension H and b) extracted data from the 2D image of the front or the side of the head of the person and from the at least one more 2D image of the different view of the head of the person. In some embodiments the at least one more 2D image is a top view image of the head of the subject. Also, in some embodiments three 2D images are used, including a top view 2D image, a front view 2D image and a side view 2D image.

In some embodiments, the method further comprises projecting a top view 2D image of the head of the person onto a top surface of the adjusted 3D representation. In other embodiments, the method further comprises tessellating the 3D representation of the head of the person and transforming it to conform to a top view 2D image. Transforming may comprise transforming (shading) data or information corresponding to a contour of the top view 2D image of the head, and may comprise one or more additional transformation operations, for example, translating, rotating, scaling or application of a non-linear function.

In another embodiment of the disclosure, a method for generating a 3D representation of a portion of a head, for example, for use in planning or performing a hair transplantation procedure is provided. The method may comprise determining a height dimension H from a 2D image of a front or a side of a head of a person, the height dimension H corresponding to a distance from a top of the head in the 2D image to a location approximately at or above a level of an eyebrow; creating a 3D dome representation of the portion of the head based at least in part on the height dimension H; tessellating the 3D dome representation of the top portion of the head; and distorting the tessellated 3D dome representation of the top portion of the head to conform to a surface of the 2D top image of the head, for example, to facilitate planning and/or performing of the hair transplantation procedure on the portion of the head. In a further embodiment, another method for generating a 3D representation of a portion of a head for use in planning or performing a hair transplantation procedure is provided. The method may comprise determining a height dimension H from a 2D image of a front or a side of a head of a person, the height dimension H corresponding to a distance from a top of the head in the 2D image to a location approximately at or above a level of an eyebrow; creating a 3D dome representation of the top portion of the head based at least in part on the height dimension H; and projecting the 2D top view image of the head to conform to a surface of the 3D dome representation of the top portion of the head to facilitate planning and/or performing of the hair transplantation procedure on the portion of the head. The step of creating the 3D dome representation of the top portion may comprise adjusting a generic 3D representation of a generic head or a portion of the generic head. In yet another embodiment, the method may comprise using at least one 2D image of a head of a person (such as a top view 2D image of the head) and a generic 3D representation of a portion of the generic head having a generic height Hg to create a 3D dome representation of the top portion of a head of a particular subject.

In yet a further embodiment of the disclosure, a method for generating a 3D representation of a portion of a head, for example, for use in planning or performing a hair transplantation procedure is provided, the method comprising: determining a height dimension H from a top view 2D image of a head of a person; extracting data from the top view 2D image of the head of the person; creating a 3D dome representation of the top portion of the head based on the height dimension H and the extracted data from the 2D image; and projecting the 2D top view image of the head, including portions with and without hair, onto the 3D dome representation of the top portion of the head to facilitate planning and/or performing of a hair transplantation procedure on the portion of the head. In some embodiments, the method may further comprise tessellating the 3D dome representation prior to projecting the 2D top view image thereon.

According to a further embodiment, a method for generating a 3D representation of a top dome portion of a head is provided. The method comprising: extracting data from a contour of a 2D image of a top 2D view of a head of a person; and adjusting a generic 3D representation of a generic head or at least a top portion of the generic head to create an adjusted 3D dome representing a top portion of the head of the person, wherein the adjusting is based on: a) the extracted data from the contour of the 2D image of the top view of the head of the person, and b) a scaling factor derived at least in part from the extracted data from the contour of the 2D image. The scaling factor may be applied to adjust a generic height dimension to reflect a distance from a top of the head in the 2D image to a location at or above a level of an eyebrow. A constant scaling factor may be applied to all parts of the generic 3D model of the patient's head, or a variable scaling factor may be utilized, the variable scaling factor differing in value depending on a specific region of the person's head, such as the front portion, back portion, a top portion, or a lower portion. In some embodiments variable scaling factor values may be used in different coordinate directions, such as the x, y and z coordinate directions. The scaling factor may comprise an aspect ratio derived from the 2D image. As in other described examples, the method may further comprise projecting the 2D top view image of the head onto the 3D dome representation. The method may comprise other steps described in reference to various embodiments, including scaling, translating, rotating, tracing contours or open-loop curves and other.

Apparatus, devices and systems configured to implement any of the above methodologies are also provided. For example, a system for generating a 3D representation of a portion of a head for use in planning or performing a procedure is provided. Such system may comprise at least one non-transitory storage medium storing instructions and one or more modules for executing operations on image data, the one or more modules comprising instructions for: determining a height dimension H from a 2D image of a front or a side of a head of a person, the height dimension H corresponding to a distance from a top of the head in the 2D image to a location approximately at or above a level of an eyebrow; extracting data from the 2D image of the front or the side of the head of the person within the height dimension H and from at least one top view 2D image of the head; and creating a 3D dome representation of the top portion of the head based on the height dimension H and the extracted data from the 2D images. Instructions may further comprise projecting the top view 2D image of the head (for example, including portions with and without hair) onto the 3D dome representation of the top portion of the head to facilitate planning and/or performing of a procedure on the portion of the head. In various implementations, the system may include an imaging device, a user interface, a touch screen display, or a combination of any of the above.

In a further aspect of the disclosure, a system for generating a 3D representation of a portion of a head for use in planning or performing a procedure is provided, the system comprising: at least one non-transitory storage medium storing instructions, and one or more modules for executing operations on image data, the one or more modules comprising instructions for: determining a height dimension (H) from a 2D image of a front or a side of a head of a person, the height dimension H corresponding to a distance from a top of the head in the 2D image to a location at or above a level of an eyebrow; extracting data from the 2D image of the front or the side of the head of the person and from at least one more 2D image of a different view of the head of the person; and adjusting a 3D representation of a generic head or at least a top portion of a generic head to create a 3D dome representing a top portion of the head of the person based on: a) the height dimension H and b) extracted data from the 2D image of the front or the side of the head of the person and from the at least one more 2D image of the different view of the head of the person. In some embodiments any of the systems of the present disclosure may be used in conjunction with or may be incorporated into a robotic system for performing medical, dermatological or cosmetic procedures.

In a yet further aspect of the disclosure a system for generating a 3D representation of a portion of a head for use, for example, in planning or performing a procedure is provided, the system comprising: at least one non-transitory storage medium storing instructions and one or more modules for executing operations on image data, the one or more modules comprising instructions for: determining a height dimension H from a top view 2D image of a head of a person; extracting data from the top view 2D image of the head of the person; creating a 3D dome representation of the top portion of the head based on the height dimension H and the extracted data from the 2D image; and projecting the 2D top view image of the head, including portions with and without hair, onto the 3D dome representation of the top portion of the head. In some embodiments, the one or more modules comprising instructions may further comprise instructions for tessellating the 3D dome representation prior to projecting the 2D top view image thereon.

In a still further aspect of the current disclosure system for generating a 3D representation of a top dome portion of a head is provided. The system comprising: at least one non-transitory storage medium storing instructions, and one or more modules for executing operations on image data, the one or more modules comprising instructions for: extracting data from a contour of a 2D image of a top view of a head of a person; and adjusting a 3D representation of a generic head or at least a top portion of a generic head to create a 3D dome representing a top portion of the head of the person based on: a) extracted data from a contour of the 2D image of the top view of the head of the person, and b) a scaling factor derived at least in part from the extracted data from the contour of the 2D image. The scaling factor may be applied to adjust a generic height dimension to reflect a distance from a top of the head in the 2D image to a location at or above a level of an eyebrow.

Other and further objects and advantages of the invention will become apparent from the following detailed description when read in view of the accompanying figures.

BRIEF DESCRIPTION OF THE DRAWINGS

Features and advantages of the embodiments described herein will become appreciated as the same become better understood with reference to the specification, claims, and appended drawings wherein:

FIG. 10 is a flow chart illustrating another example of a general method for generating a 3D representation of a top dome portion of a head.

FIGS. 11a-11h illustrate examples of implementations of various methodologies for adjusting a generic 3D representation of a generic head according to the present disclosure.

DETAILED DESCRIPTION OF SPECIFIC EMBODIMENTS

Figure 1:
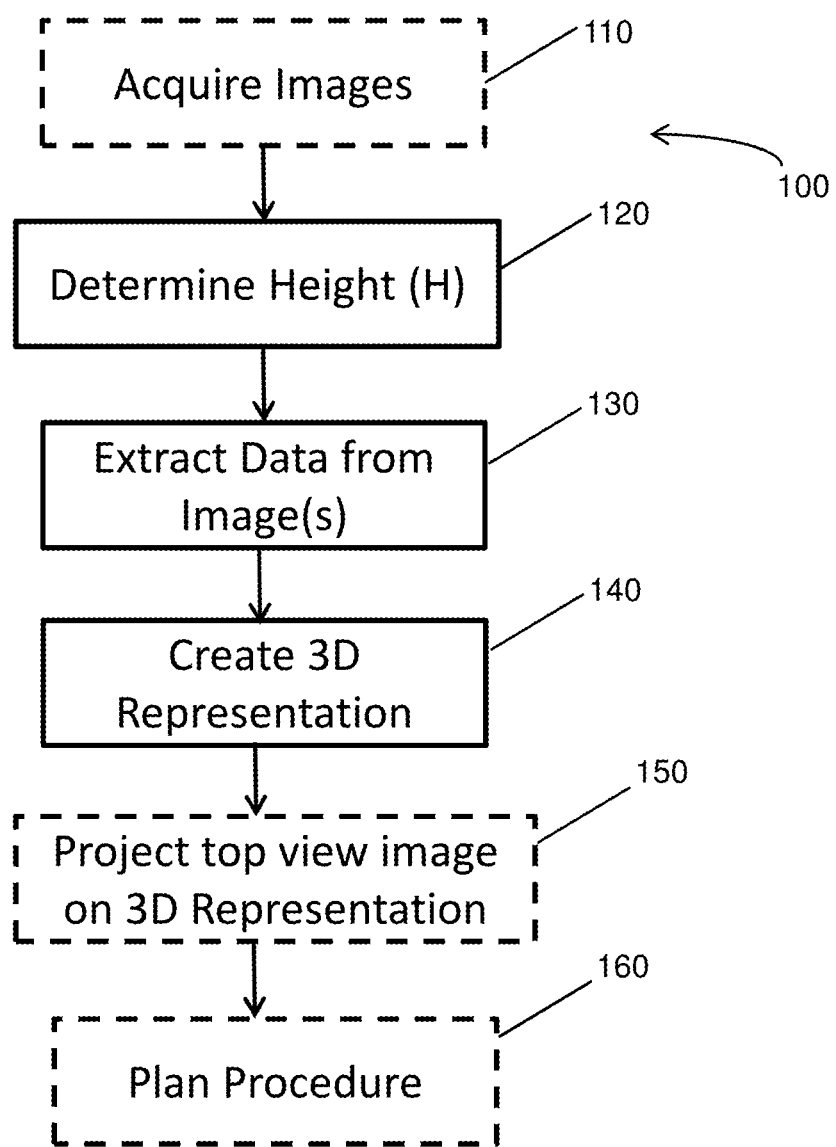
FIG. 1 is a flow chart illustrating an example of a general method for generating a 3D representation of a top dome portion of a head.

With reference to the above-listed drawings, this section describes particular embodiments and their detailed construction and operation. The embodiments described herein are set forth by way of illustration only and not limitation. For example, the sizes, shapes, angles and relative positions of elements in the drawings are not necessarily drawn to scale. Those skilled in the art will recognize in light of the teachings herein that, for example, other embodiments are possible, variations can be made to the example embodiments described herein, and there may be equivalents to the components, parts, or steps that make up the described embodiments.

For the sake of clarity and conciseness, certain aspects of components or steps of certain embodiments are presented without undue detail where such detail would be apparent to skilled persons in light of the teachings herein and/or where such detail would obfuscate an understanding of more pertinent aspects of the embodiments.

In the field of hair transplantation, patients have rather limited options available to them in terms of getting an accurate idea of what they might look like if they have a hair transplantation procedure performed. One option is to look at the before and after photos of other people, and to guess what the outcome of their procedure might look like on them. Another option is to superimpose a wig or a virtual hairstyle on an image of themselves. No matter which option is selected, the results do not allow for a realistic representation to be obtained. For example, the people depicted in photographs may not have a forehead, head shape, hair type or hair quality similar to that of the patient. Further, the superimposition of a wig may not be positioned or located on their image in such a way that the wig looks natural, and the color, texture or curl options may not accurately reflect their natural hair color, texture or tightness/looseness of curls. Moreover, the planning process for each individual patient has the additional complication that the number, location and positioning of each individual hair has to be considered when creating a treatment plan. In addition, the available solutions to this problem do not allow the treatment provider or the patient to see what hair transplantation looks like from different angles, allowing them to know how they will be viewed from behind or from the side, and/or provide solutions for modeling a head that are time consuming, complicated and expensive.

A system and methodology that allows one to obtain a 3D representation in the form of a realistic visual image of at least a top dome portion of a subject's head to enable, for example, a hair piece or wig to be created, the planning of a hair transplantation procedure or facilitating of an actual hair transplantation to be carried out is desirable. It would be also desirable that such system and methodology enable patients and physicians to view a realistic 3D representation from a plurality of angles, and additionally, allow such a realistic visual representation to be obtained quickly, efficiently and without encountering significant cost.

The ability to generate a 3D model of a subject has been known for years, particularly with the increased use of virtual or simulated images in the movie and video game industries. In the movie industry, vast sums of money are spent in simulating images that are realistic in appearance to ensure that to the user the simulations cannot be differentiated from the actual real images. Similarly, the video game industry expends a substantial amount of processing time to create realistic life-like images. In both of these industries high resolution and quality is required, and complex processing is necessary as well to satisfy the demand. In the gaming industry in particular, the improved quality expectations have resulted in an increase in processing power and speed, as well as a financial cost. Additionally, these industries typically invest a significant amount of time into pre- and post-processing. Moreover, since the goals and objections of realistic models for purposes of movies and video games are very different than those for medical and cosmetic procedures, the actual parts or elements, for example, of the head modeling that needs to be realistic and accurate for the purposes of the movies and video games are not the same as those that need accuracy for purposes of medical procedures, such as hair transplantation.

Typically in the creation of movies, animated characters and gaming creatures or persons, the entire character, creature or person is created. In the generation of a 3D model of the head of the hair transplant patient, unlike the movie or video game industry, the goals and objectives are very different. More specifically, the medical, cosmetic or dermatological procedures, such as hair transplantation in particular, present a unique set of requirements, necessitating generation of a 3D model and simulating both existing and new implanted hair, which is far different from the parameters found in the video, gaming or movies. For example, a patient of a hair transplantation procedure specifically wants to know, for example, what the implanted hair will look like and how it will blend with his/her existing hair, while the physician may want to simulate a treatment plan on a specific area of interest or simulate the creation of implantation sites on the scalp, or perhaps track the progress of hair loss or hair gain over a period of time. For such purposes there is no real need to create a 3D model of an entire organ, or to model an entire face, which brings the complexity, the increased processing time and unnecessary expense. Consequently, the existing techniques and approaches that are currently used for purposes of 3D modeling in video games, movie animations and some medical applications do not provide adequate solutions for the purposes of tracking the progression of hair loss/gain, or simulating the appearance of hair on a patient's head for planning purposes, or to demonstrate potential results of medical treatment and other similar applications, in terms of cost, speed and efficiency.

As indicated above, there are commercially available modeling products/software that are used to create a 3D model of a head from 2D images. In some of these commercially available products, in order to generate a three-dimensional model of a head, the user assigns a series of feature points on the various front and profile images, the feature points representing distinct physical locations (e.g., corners of the mouth, nose, chin, ears, etc.) of the patient's face. The process is repeated for assigning feature points to each of the front and side profile image(s). From this, the software is able to create a 3D model, for example, as disclosed in U.S. Pat. No. 7,646,909. In others known solutions multiple digital images are "stitched" together, or polygonal meshes are created, typically meshes of triangles. Points in 3D space are connected by line segments to build a 3D model. One example of such implementation is disclosed in U.S. Pat. No. 7,289,662. However, none of the above-mentioned existing products address the issues and provide solutions that can be successfully used for the purposes of certain procedures, such as hair transplantation.

The present disclosure addresses the unsolved need and provides novel methods, systems and instruments for creating a partial model of a body, for example a head, for use in planning or tracking a procedure, such as a hair transplantation. The methodology allows an accurate and time-efficient 3D representation to be generated of an identified portion of the body, such as a portion of the head, instead of the entire head, from two or more 2D images, such as still images. In this manner, valuable time and processing capability, and therefore money is saved, enabling creation of an accurate, cost and time-efficient 3D image of a portion of a head.

It should be noted that although the present disclosure is particularly useful in hair harvesting, site making and implantation, it is not limited to hair transplantation or hair restoration. The methodology and device of the present disclosure may also be beneficial to other procedures that require a model of a portion of a patient's body or body surface, such as a top portion of a subject's head. For example, various medical, cosmetic and dermatological procedures involving, for example, treatment planning, tracking and procedure performing may benefit from the systems and methods described herein. Such procedures may include, but are not limited to, plastic or brain surgery, forehead wrinkle removal or injections of cosmetic substances, skin grafting procedures or correction of birth mark defects or moles on the forehead or upper portion of the head, hair tattooing, for example, on a scalp, or tattoo removal. For convenience of description, the following description will be discussed by example in reference to hair transplantation procedures. It should be noted, however, that such description is for the purposes of illustration and example only and is not intended to be exhaustive or limiting.

FIG. 1 is a flow chart illustrating an example of a general methodology 100 employed according to one aspect of the present disclosure. FIG. 1 represents a block diagram of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. The proposed steps may be substantially automated, which means that some or all of the steps could be performed automatically, for example, by a processor or other computing device. It does not exclude, however, that the user may intervene and participate, for example, by giving an alternative command through a user interface, or override the automated command.

Figure 4:
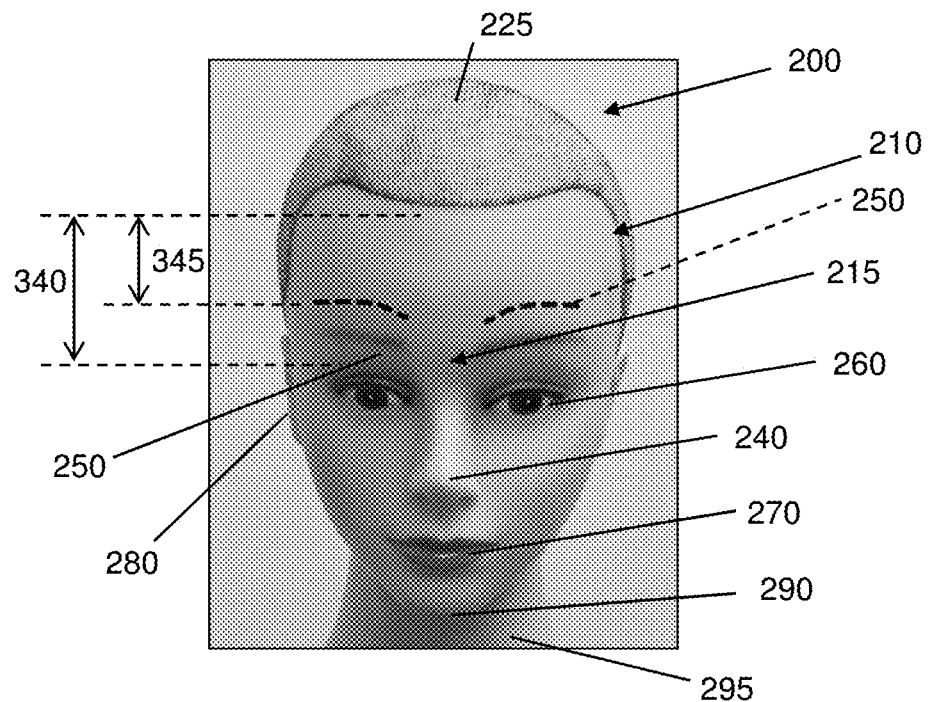
FIG. 4 illustrates another front view image of a head.
Figure 5:
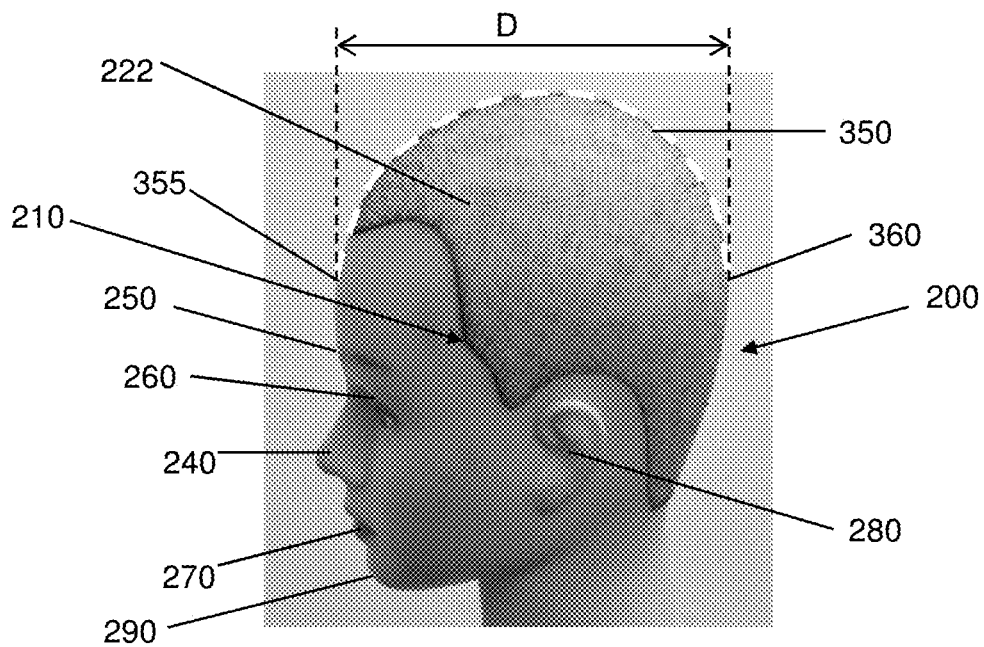
FIG. 5 illustrates an example of a side view 2D image of a head with a side view open-loop curve.
Figure 6A:
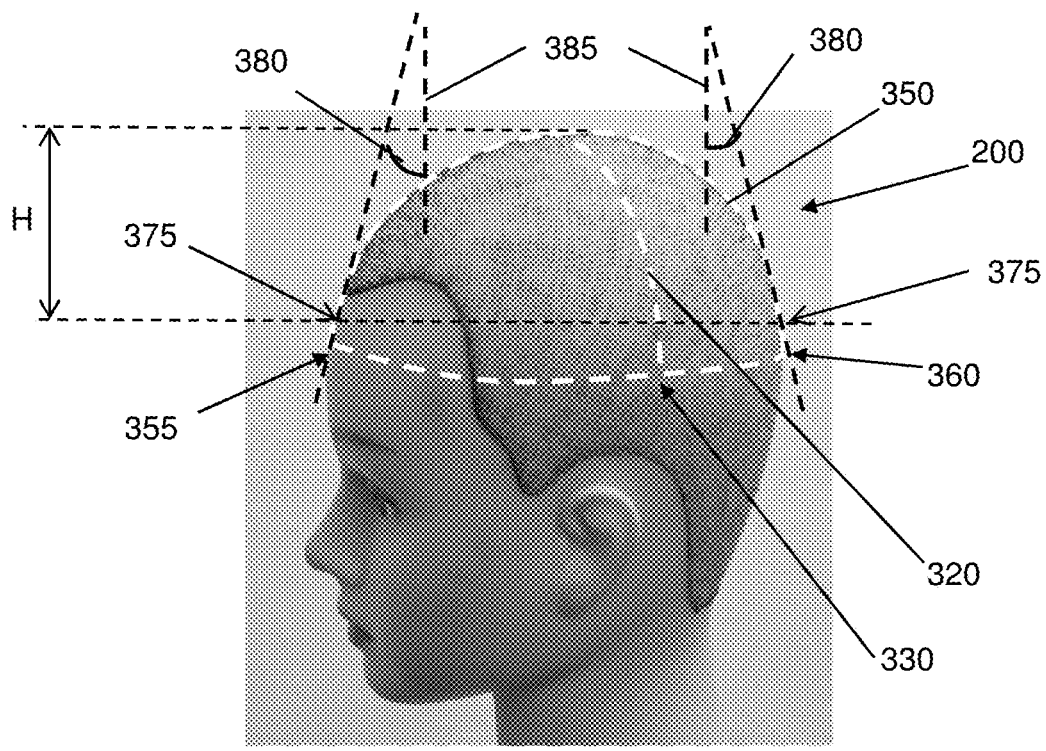
FIG. 6a illustrates an example of the image of a head with the contours or curves such as those identified in FIGS. 2, 3 and 5 according to the methodology of the present disclosure.
Figure 6B:
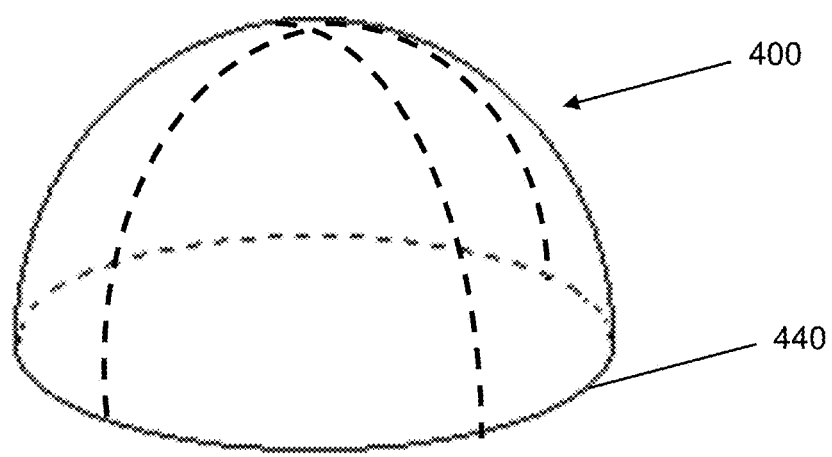
FIG. 6b illustrates a 3D representation of the top dome portion defined by the contours or curves of FIGS. 2, 3 and 5.

FIGS. 2-5 illustrate examples of 2D images of a head 200, the 2D images taken from various views. FIGS. 6a and 6b illustrate how the 2D images of the head 200, such as those illustrated in FIGS. 2-5, may be utilized to create a 3D representation of a portion of the head for use in planning or performing a procedure according to methodology 100 of FIG. 1.

Prior to or as a part of the methodology according to one implementation of the present disclosure, two or more images of a subject's head 200 may be acquired (per step 110). The two or more images may comprise an image taken from above the subject's head (top view, FIG. 2), an image from the front of the subject's head (front view, FIGS. 3 and 4), or an image from the side of the subject's head (side view, FIG. 5). Even though the side view illustrated in FIG. 5 shows an image taken from the left hand side of the subject's head, it will be appreciated that the side view image may equally be taken from the right hand side of the subject's head.

The image of the top view (FIG. 2) generally may comprise a front hairline or a hairline 210, and depending on a level of hair loss or hair health of a particular person, one or more areas of hair 220 and potentially areas without hair 230. Some areas without hair 230 may be disposed within an area of hair 220 (as shown). The top view image may also typically comprise at least a portion of the subject's nose 240 and in some instances portions of the subject's ears (not shown). The front view image (FIGS. 3 and 4) typically comprises the hairline 210, though from a different view, a front portion 225 of an area of hair 220, as well as the subject's two eyebrows 250, two eyes 260, the nose 240 and a mouth 270. The front view image also comprises the subject's ears 280 and a chin 290, which may be difficult to differentiate from the subject's neck 295. The side view image (FIG. 5) or a side profile image of the head typically comprises at least a portion of the hairline 210, a side view 222 of an area of hair 220, one eyebrow 250, one eye 260, the nose 240, mouth 270, an ear 280 and the chin 290.

A methodology of the current disclosure, as described in detail below, allows a 3D representation to be rendered of a particular top portion of the head appearing in the image that is actually useful and at the same time sufficient for planning or performing a procedure. The methodology of the present disclosure eliminates the rendering of portions of the head and/or features which typically require a significant amount of processing power and time but are not important or useful in planning or performing the procedure. Such features comprise, for example, the eyebrows, eyes, nose, lips and chin or other portions of the face with the pronounced angles and curvatures. At the same time, the present methodology determines and still allows the capture in the 3D partial representation such portion of the subject's head that is sufficient for accurate rendering and planning of the procedure. In this manner the amount of time required for processing data from the 2D images and rendering the 3D image is substantially reduced, and the processing power required substantially less than if a 3D representation of the entire head 200 generated, all while providing an accurate partial model for planning and performing a procedure.

Figure 2:
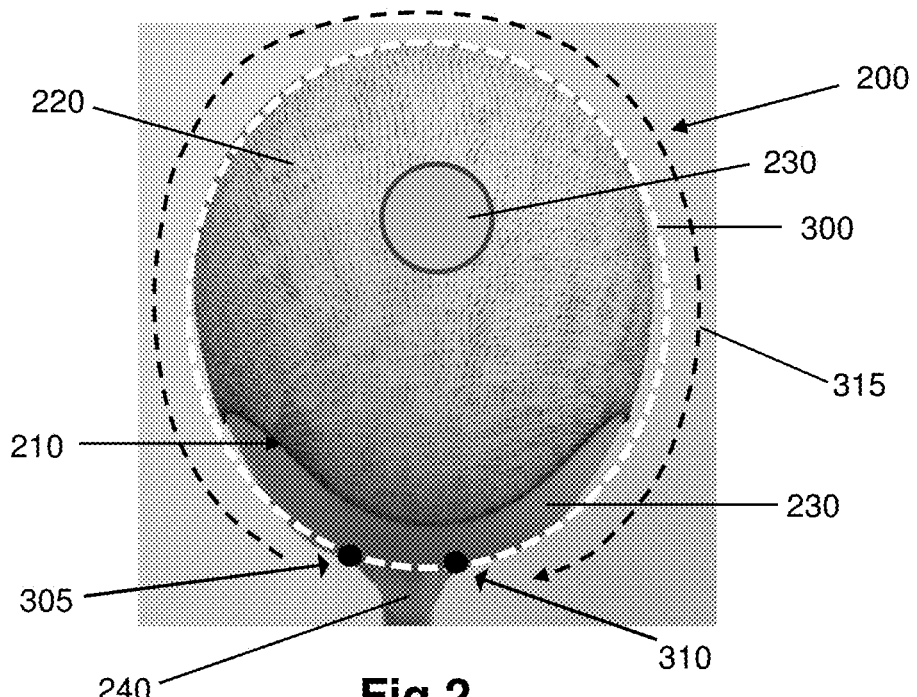
FIG. 2 illustrates an example of a top view 2D image of a head of a subject with a top view contour displayed.

For example, from the top view image (shown in FIG. 2) a contour, or outline or a curve 300 (e.g., closed-loop curve) of the shape of the top of the head 200 may be identified and extracted for use in step 130 of the general methodology of FIG. 1. Such contour excludes any features that protrude outwardly, such as nose or ears, and complicate an otherwise more simple generally circular or oval shape of the contour. Identifying the above contour or a closed-loop curve 300 of the top of the head may be conducted by various methods. In one embodiment, the contour 300 of the shape of the top of the head 200 may be identified automatically by a contour identification module of an image processor using various methodologies and techniques knows to those skilled in the art, including for example, segmentation, contouring, edge recognition and other known image processing techniques. In another embodiment, the contour 300 of the shape of the top of the head 200 may be identified by having a user tracing an outline of the top 2D image of the subject's head with a finger or a stylus on a touch screen of a display device. As shown in FIG. 2, the tracing may start on one side of the nose 240, for example at a location marked as a point 305 in FIG. 2 and continue all the way around, or at least to the point 310 on the other side of the nose 240. The tracing may be done in a direction 315 or the opposite direction, and such tracing may be completed in a full closed loop or may leave a small gap corresponding to the location of the nose 240. In either case, the contour identification module of the processor is able to close the gap and complete the closed-loop curve or contour 300. By using the above-mentioned method of tracing, the system is able to identify a location of the nose 240, and therefore, identify a particular orientation of the face of the subject in this image. This orientation may be used in conjunction with identification of the location and orientation of the face of the subject in other image views to aid in the generation of the 3D representation.

Figure 3:
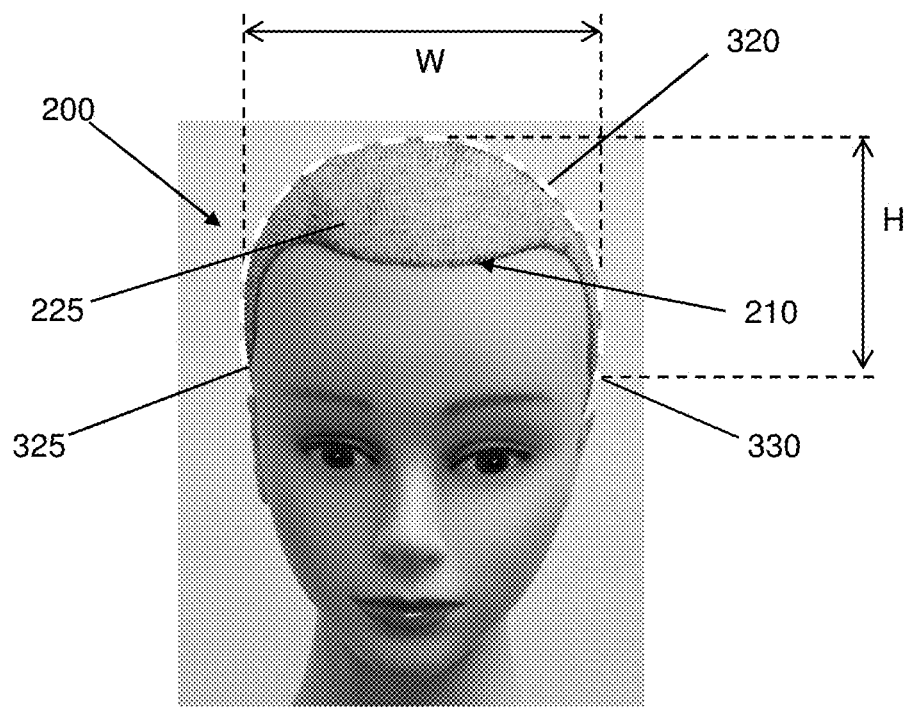
FIG. 3 illustrates an example of a front view 2D image of a head of a subject, including a height dimension (H) and a front view open-loop curve.

From any one of a top view 2D image (FIG. 2), a front view 2D image (FIGS. 3 and 4) or a side view 2D image (FIG. 5) of a particular person an important parameter of the height H may be determined (step 120 of the methodology of FIG. 1). In the example of the methodology of FIG. 1, this height dimension H is used in creating a 3D dome representation of a particular top portion of the person's head (step 140 of the methodology of FIG. 1) that accomplishes the goals of creating cost and time-efficient and accurate solution for planning and performing various procedures. In the example described below the height H is determined from the front view 2D image (FIG. 3). In one implementation the height H may be derived or determined by having a user trace, for example, with a finger or a stylus, an open-loop curve or contour 320 (which can be also referred to as a "front open-loop curve", a "front curve" or a "front contour") of the top of the head 200. The user may start tracing the front curve 320 either from a point 325 on one side of the head 200 or from a point 330 on the other side of the head 200, the points 325, 330 disposed at any appropriate height above the eyebrows as further explained below. In one embodiment, selecting of either of the starting points 325 or 330 will define the height H, which is a vertical distance between the top-most point of the head and the location 325 on one side of the head or the location 330 on the other side of the head 200 (refer to FIG. 3). In an alternative, the height H may be defined from the average of a vertical distance between the top-most point of the head and the location 325, and a vertical distance between the top-most point of the head and the location 330. Criteria for selection of the starting tracing point 325 or 330 (and accordingly the height H) are described and explained below. It will be understood that the starting point, the end point and the whole front curve 320 may be selected and traced by the user, or could be automatically determined, for example, by a contour identification module (e.g., of an image processor) in accordance to the criteria or parameters described below. It will be also understood that the system may automatically adjust positions of the ends points 325 and 330 of the front curve 320 (whether they are selected by the user or automatically determined) to make sure that they are symmetrically positioned at the same vertical distance or height from the top-most point of the head.

The criteria for selecting the height H (regardless of how it is determined) will be described now. As already stated above, it was determined that it is desirable that the height H shall be chosen such that anatomical features with the pronounced curvatures and angles be excluded from consideration, thereby reducing the processing time involved and simplifying the image processing algorithms required. Therefore, in some embodiments depending upon the application the height dimension H may be no greater than the distance between the top of the head 200 and the top of the eyebrows. In other embodiments, additional considerations may be taken into account when determining the height dimension H. Assuming the procedure to be planned or performed is a hair transplantation procedure, the area of interest (e.g., the area into which hair is to be implanted) will typically include areas of reduced hair density, which may include locations both behind and in front of the receding hairline 210. Therefore, when generating a 3D representation of the top dome portion of the head 200, it is desirable that the height H be identified such that these areas are included. For a natural looking hairline, typically, as shown in FIG. 4, the maximum vertical distance 340 between the hairline 210 and the glabella 215 (the location between the eye brows and above the nose 240) is in the range of approximately 7-8 cm, or approximately the width of four fingers of the subject's hand. It has been also observed that typically, if the subject is frowning, the vertical height distance 345 between the top of the raised eyebrows and the hairline 210 should be no less than 1 cm. Therefore, when planning to implant hair to restore a receding hairline, it would be desirable for the 3D representation of the top dome portion of the head have sufficient height H to include the area that takes into consideration the above-described points. In some embodiments, the height H may be identified to be the distance between the top of the head and a location selected by the user based on his/her experience, as well as the specific features of a particular subject. For example, if a particular individual has a very pronounced or unusual curvature of the forehead in the area above the eyebrows, then instead of selecting the height H to be the full distance between the top of the head and the top of the eyebrows, the height H may be reduced to extend only, for example, to the middle of the forehead. Such reduced height H for this particular subject will eliminate the highly curved lower portion of the forehead to reduce the processing time and improve efficiency of the modeling while still providing the accurate representation. In certain embodiments, the height dimension H may be 25% to 80% of the distance between the top of the head and the eyebrows.

In another embodiment, the height H may be determined based on one or more locations 375 (as seen in FIG. 6a) where an angle between a tangent on a front or side curve or contour of the top portion of the head of a subject and a substantially vertical line is less than a predetermined or threshold angle 380. Depending on a particular feature of the shape of the head of the subject, in certain implementations (as seen in FIG. 6a) the location 375 may be chosen as a lowest point above the eyebrows that meets the predetermined angle criteria. The predetermined or threshold angle 380 may comprise an angle in the range, for example, of 40-60 degrees, such as 45 or 50 degrees.

In yet further embodiments, the height dimension H may be determined based, for example, of the dimension of the width W of the subject's head (as illustrated in FIG. 3) and/or the depth D of the subject's head (as illustrated in FIG. 5). In some examples, such determination may utilize look-up tables or similar databases, which may provide a height dimension H for various combinations of depth D and width W. In other examples, such determination may be based on prior knowledge, for example, statistical or historic data of previous patients.

In another alternative implementation the height dimension H may be determined from a top view image, such as that illustrated in FIG. 2. Such a determination may be carried out using techniques known to those skilled in the art. For example, the height dimension H may be determined using 3D depth camera, such as a time-of-flight camera or structured light depth cameras, which are able to determine distance by measuring the time-of-flight of a light signal between the camera and the subject for each point of the image.

In further embodiments, if a side view image (FIG. 5) is used instead of or in addition to the front view image, from such side view image an open-loop curve or contour 350 (which can be also referred to as a "side open-loop curve", a "side curve" or a "side contour") of the top of the head 200 may be identified in a manner similar to that discussed in reference to FIG. 3. As seen, the side open loop curve 350 runs from a point 355 on the forehead to a point 360 on the back of the head. Typically, these points 355 and 360 will be disposed such that they are at substantially the same vertical distance H from the top of the head, as points 325 and 330. As mentioned in reference to FIG. 3, the processor may automatically adjust the locations of the points 355 and/or 360 to make sure that they are in fact at the substantially the same vertical distance H from the top of the head. In some embodiments, the system may be configured such that once the locations 325 and 330 have been identified, a virtual dome portion is superimposed on the side view image (FIG. 5), assisting the user in identifying the locations 355 and 360. In another embodiments, the contour identification module may automatically identify the side curve 350 utilizing, for example, the locations 325 and 330, and using various known image processing techniques (e.g., contouring, edge detections, etc.).

The identified one or more contours (closed or open-loop curves) 300, 320 and 350 provide data, such data comprising information about the curves themselves or a plurality of points along the curves. The data is extracted (step 130) from the relevant images and based on such extracted data and the determined height H (from step 120), a 3D representation generation module may be configured to create a 3D representation 400 of the top dome portion of the head 200, as illustrated in FIGS. 6a and 6b (step 140 of the methodology of FIG. 1). In some embodiments, if the user has traced both a front open loop curve (or contour) 320 and a side curve 350, the height H may be determined to correspond to the shortest, or the longest vertical height, or any vertical height in between, with each vertical height corresponding to each point along the identified curve. The base 440 of the 3D representation 400 of the top dome portion of the head of FIG. 6b may, therefore, correspond to a plane including the end points 325 and 330, or the end points 355 and 360, depending on how the height H is chosen. In other embodiments, when the user traces a front or side curve (such as 320 or 350), each point on such curve has a corresponding height, and the height H may be derived or determined from such traced points of the curve, for example, as the highest height. The 3D representation of the dome portion of the subject's head 200 may comprise an array of voxels, an array of elements of volume that constitute a notional three-dimensional space. As shown, the height H (step 120) and extracted data (step 130) combined, enable a 3D representation of the dome portion 400 of the head 200 to be generated without rendering portions of the images of the head 200 which comprise certain anatomical features such as the nose 240, eye brows 250, eyes 260, or mouth 270.

In some embodiments, the 3D representation may be based on virtual data derived from the one or more contours 300, 320 and 350, comprising the relative dimensions such as width, height and depth derived from the 2D images, wherein one or more of the 2D images may have been transformed by translating, rotating, scaling, and/or subjected to a non-linear function, to normalize the 2D images to one another. In other embodiments the 3D representation may be based on actual or real-world distances, requiring a distance conversion ratio to be determined, a virtual to real-world distance conversion ratio. Such a conversion ratio may, for example, require that the user identify a measurement line on a 2D image, for example, by drawing a measurement line with a finger or a stylus on a touch screen of a display device. The measurement line (which may comprise a curve) may be drawn, for example, between two fiducials placed on the patient's head and appearing in the 2D image, or between two anatomical distinguishable features that are identifiable in the 2D image. The user may then take an actual physical measurement of this distance and input it via a user interface into the system. In this manner, a conversion module is able to calculate/determine a virtual to real-world distance conversion ratio. In other embodiments, if no measurement line is drawn, a default virtual to real-world distance conversion ratio may be utilized, the default determined using an approximation.

In some embodiments, once generated, the 3D representation 400 of the dome portion of the head 200 may be modified if desired. Such modification may comprise editing, modifying or re-tracing one or more of the curves 300, 320 and/or 350. In an alternative, the 3D representation 400 of the top dome portion of the head 200 itself may be modified by the user, for example, by selecting a point or line on any one of the outlines and dragging it/them by stretching/compressing as desired. Modification my also comprise rotating or translating any portion of the outlines.

Once a 3D representation of the top dome portion of the head 200 has been generated and is considered acceptable, in some embodiments or implementations, in step 150, the top view 2D image (FIG. 2), or at least the portion of the top view image within the outline 300, may be projected onto the surface of the 3D representation utilizing projection techniques known to those skilled in the art. For example, once the 3D representation of the dome portion has been generated, the object-space vertex coordinates of the 3D representation of the dome portion may be transformed (via translation, rotation, scaling or via application a non-linear function) such that the contours of the 3D representation of the dome portion correspond to contours identified in the 2D images, or visa-versa. Once this transformation has been completed, the top view 2D image, or at least the portion of the top view image within the outline 300, may be projected onto the transformed 3D representation. Values, for example color values within the 2D image at the corresponding object-space vertex coordinates may then be applied to the 3D representation of the dome portion at the object-space vertex coordinates.

Figure 7A:
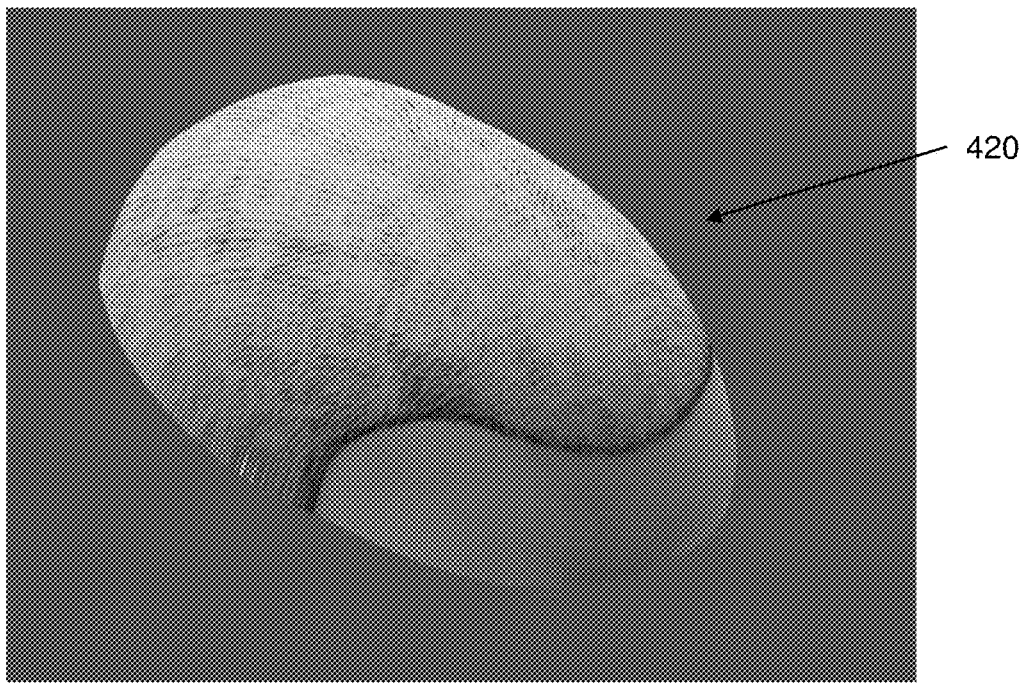
FIGS. 7a and 7b illustrate examples of 3D representations of a top dome portion of a head generated by the methodology of the present disclosure from 2 different views, respectively.
Figure 7B:
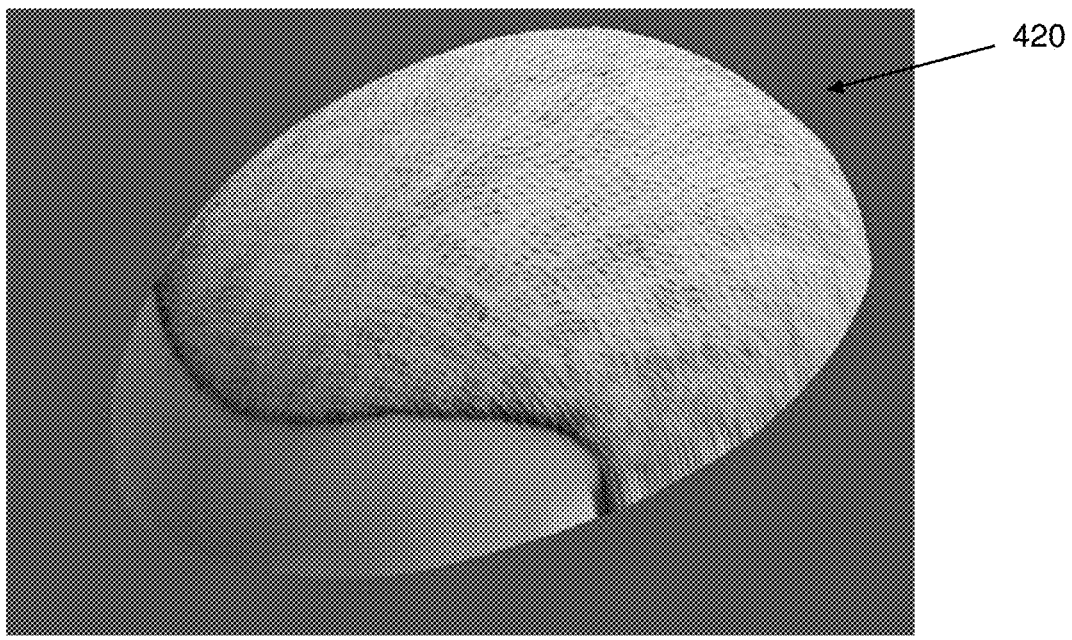

In an alternative, the 3D representation 400 of the top dome portion of the subject's head 200, may be tessellated (tiled) in a pattern of geometrical shapes, which do not overlap, and with no holes in the pattern. Typically, a tessellation comprises the use of many adjacent polygon shapes such as triangles, squares or hexagons, for example. Once created, the top view 2D image may be projected in one or more ways such that it conforms to the top surface of the tessellated 3D representation 400 of the top dome portion of the subject's head 200. For example, once the curve or contour 300 in the top view 2D image has been identified, object-space vertex coordinates of the tessellated 3D representation of the dome portion of the head may be transformed as explained above, and the transformed object-space vertex coordinates used to look up values within the top view 2D image. In this manner the texture coordinates can be generated dynamically based on a current state of the 3D dome surface. Other such distortion and tessellation techniques are known to those skilled in the art and will not be described in greater detail herein. The result of the projection or distorted tessellation is illustrated in FIGS. 7a and 7b. FIGS. 7a and 7b show two different views of the same 3D representation of the dome portion 420 of the head 200, which have been generated such that no anatomical features requiring additional processing power and time are generated. Once this 3D representation of the dome has been generated, the user can plan a procedure or use the 3D representation for actually performing the procedure. For example, as 2D top view image will comprise hair, if any, and/or bald areas, if any, the projection of such top view on the 3D dome will reflect any areas with existing hair or any bald areas.

Figure 7C:
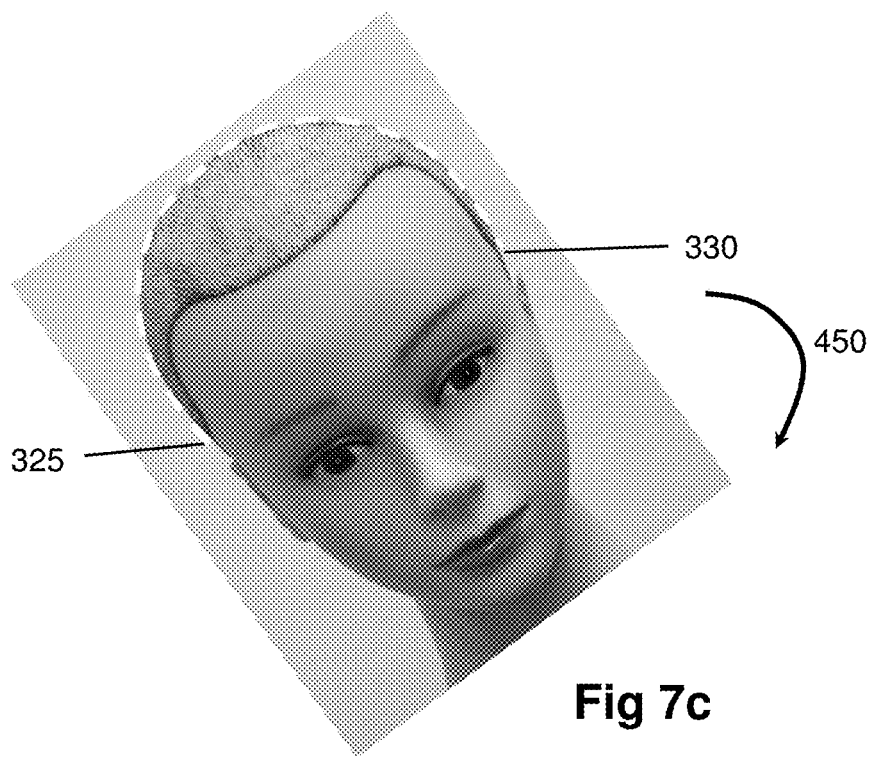
FIGS. 7c and 7d illustrate examples of front images of the head, with FIG. 7c being rotated at a different angle with respect to FIG. 7d.
Figure 7D:
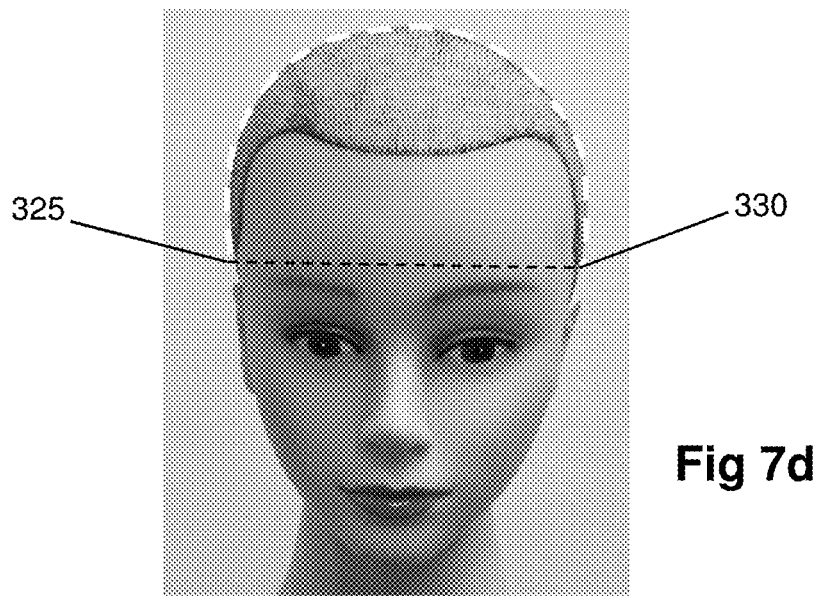

Turning now to FIGS. 7c and 7d, it can be seen that the front view 2D image of FIG. 7c is rotated at an angle with respect to the front view 2D image of FIG. 7d, with both figures showing a location 325 on one side of the head, and another location 330 on the other side of the head. It will be appreciated that rather than the image being rotated, the head of the person appearing in the image may be tilted, as he/she may not be standing or sitting upright. In FIG. 7c, the 2D image is rotated to the left or the head is tilted to the left (from the reader's view). To ensure that any curves or contours identified by the user on any 2D image, or any data points that are disposed along any identified curve or contour, can be matched to the correct location in corresponding 2D images, an image orientation correction module is provided. The image orientation correction module automatically compensates for incorrectly oriented 2D images or incorrectly oriented subjects. Assume, for example, that the user has identified locations 325 and 330, which are locations that would ordinarily have been vertically aligned with each other if the person in the image was in an upright position. The image orientation correction module rotates the incorrectly oriented image of FIG. 7c in a clockwise direction 450, such that the locations 325 and 330 are substantially aligned in a vertical direction, resulting in the 2D image of FIG. 7d. In this manner, compensation for an incorrectly rotated 2D image can be provided and taken into account when transforming any 2D image, or contour/curve identified on any 2D image, prior to creating the 3D representation.

Figure 8:
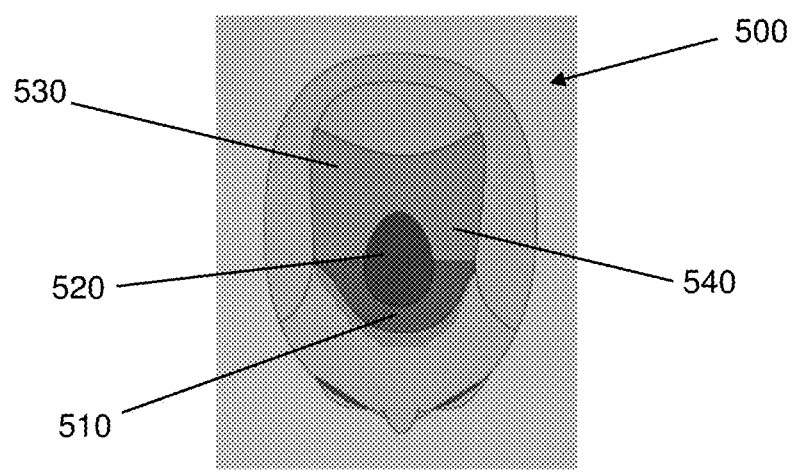
FIG. 8 illustrates an example of a template for use in a hair transplantation procedure.
Figure 9A:
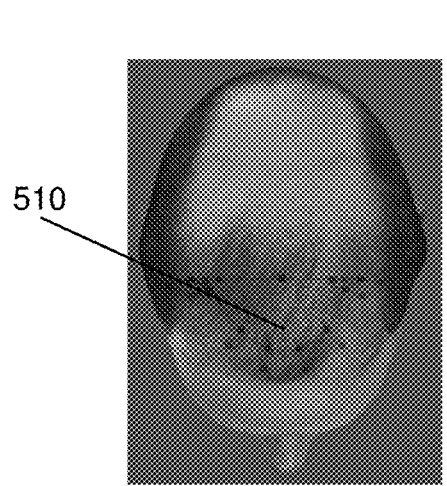
FIGS. 9a and 9b illustrate an example of how the templates can be combined with the 3D representation of a top dome portion of a head to assist with planning a hair transplantation procedure.
Figure 9B:
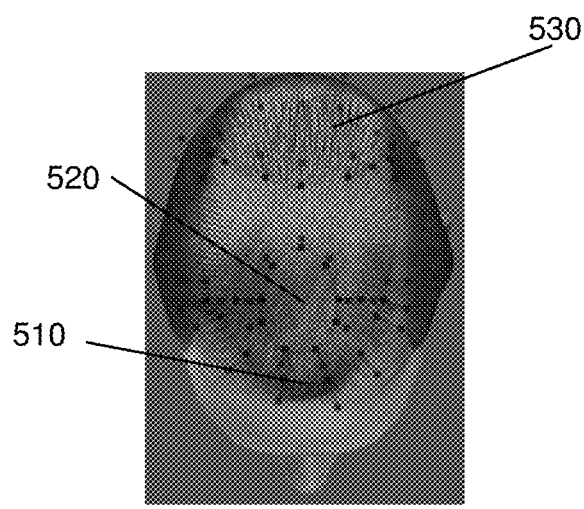

If planning a hair transplantation procedure, for example, the user may be able to select a template 500 from an image repository such as that depicted in FIG. 8. Once a template 500 has been selected, he/she may further select one or more elements into which it may be proposed that follicular units or hair grafts be implanted. For example, the user may select one or more of a frontal element 510, a forelock element 520, a mid-scalp element 530, or a crown element 540 as element(s) into which hair is to be implanted. The modeling software may then generate and the planning system display on the user interface monitor of the planning system representations of the selected elements on the 3D representation 400 of the patient's head/scalp. FIGS. 9a and 9b illustrate two such examples. In FIG. 9a the outline of a proposed hair element comprising the frontal element 510 has been superimposed on a top view image of the subject. In FIG. 9b, the outlines of the frontal element 510, the forelock element 520 and the mid-scalp element 530 have been selected, for example, by the user and superimposed on a top view image of the subject. In this manner a procedure can be planned, step 160 of the methodology of FIG. 1. In some embodiments, planning of a procedure may further comprise simulating hair implantation sites or hair follicles.

FIG. 10 is a flow chart illustrating another example of general methodology 1000 according to the present disclosure. FIG. 10 represents a block diagram of methods, apparatus (systems) and computer program products according to embodiments of the present disclosure. As before, it will be understood that each block of the flowchart illustrations and/or block diagrams, and combinations of blocks in the flowchart illustrations and/or block diagrams, can be implemented by computer program instructions. The proposed steps may be substantially automated, which means that at least some of the steps could be performed automatically, for example, by a processor or other computing device.

Optionally, prior to or as a part of the methodology of the present disclosure, two or more images may be acquired (step 1010) of a subject's head 200. The two or more images may comprise an image taken from above the subject's head (top view, FIG. 2), an image from the front of the subject's head (front view, FIGS. 3 and 4), or an image from the side of the subject's head (side view, FIG. 5). As before, even though side view illustrated in FIG. 5 shows an image taken from the left hand side of the subject's head, it will be appreciated that the side view image may equally be taken from the right hand side of the subject's head.

Figure 11G:
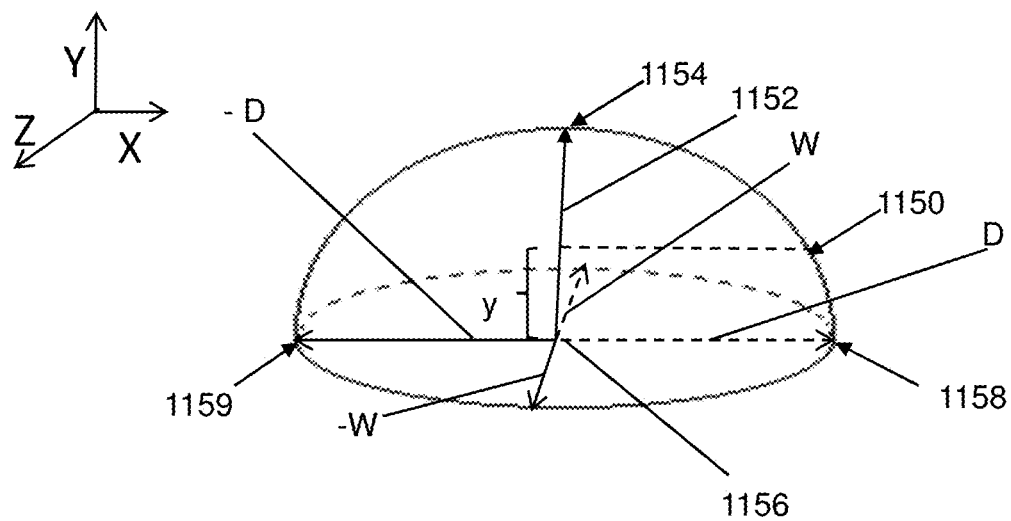

Similar to the methodology 100 depicted in FIG. 1, in some embodiments a height H of the curve 320, that is the vertical distance between the location 325 on one side of the head or the location 330 on the other side of the head 200 and the top of the head 200 (refer to FIG. 3) may be determined (optional step 1020). Alternatively, an average of these vertical distances can be utilized as the height H in the optional step 1020. Data may be also extracted (step 1030) in a similar manner to that described above from one, two or more images, also as described above. Also as described above, optionally, incorrect orientation may be corrected by means of an image orientation correction module. However, according to this embodiment of the disclosure, rather than generating a 3D representation of the top dome portion of the subject's head 200, for example, directly from the extracted data, the methodology of this embodiment starts with a generic 3D representation of the whole generic head or a portion of the generic head, as shown in FIG. 11a (step 1040), and then further adjusts such generic 3D representation based on the extracted data (step 1050). In one embodiment the generic representation 1100 (seen FIG. 11a) of the top portion of a subject's head may comprise a geometric shape, for example a whole sphere or half a sphere, though any suitable shape may be utilized. The generic 3D representation 1100 may be subsequently adjusted in some embodiments based on the determined height H of a particular subject, while in other embodiments the generic 3D representation from the beginning may be created to represent a portion of the sphere already cut at a predetermined generic height Hg (as shown as one of the examples in FIG. 11a). The generic height Hg may be based on some statistical or historic data for a particular group or type of patients. In some of those embodiments where the generic 3D dome having the height Hg is used, such generic dome may be still further adjusted (step 1050) based, for example, either based on the determined height H for a particular patient, or as further described in reference to various examples of FIGS. 11f-11h. Alternatively, in other embodiments where the generic 3D dome having the height Hg is used, such generic 3D dome may be adjusted only based on the extracted data corresponding to one or more of the outlines 300, 320 and 350 (e.g., as described in reference to the methodology of FIG. 1) and without further adjusting the generic height Hg to correspond to the actual height H of the subject. In various embodiments, the adjusting step 1050 may comprise carving or morphing the shape of the generic 3D representation, including one or more of scaling, translating and rotating the generic 3D representation, thereby normalizing the contours of the generic 3D representation to correspond to one or more contours of the 2D image used. In another embodiment of the disclosure, adjusting the generic 3D representation may comprise at least one of or any combination of the following: adjusting the height dimension of the generic 3D representation to correspond to the height dimension H extracted from the images, adjusting the height dimension of the generic 3D representation using techniques described in reference to FIGS. 11*f*-11*h*, adjusting the width dimension of the generic 3D representation to correspond to the width dimension W extracted from the images, and adjusting the depth dimension of the generic 3D representation to correspond to the depth dimension D extracted from the images (see, for example, FIG. 11*b*).

Having adjusted the generic 3D representation of the generic head to create a 3D representation 1110 of the top dome portion of the subject's head, once again the top view image (FIG. 2, or parts thereof) may be projected on the surface of the adjusted 3D representation in step 1060, and as illustrated in FIG. 11*c*.

FIG. 11*d-h* (described later) demonstrate further examples of how the generic model dome may be adjusted based on the information extracted from one or more 2D images.

Figure 12A:
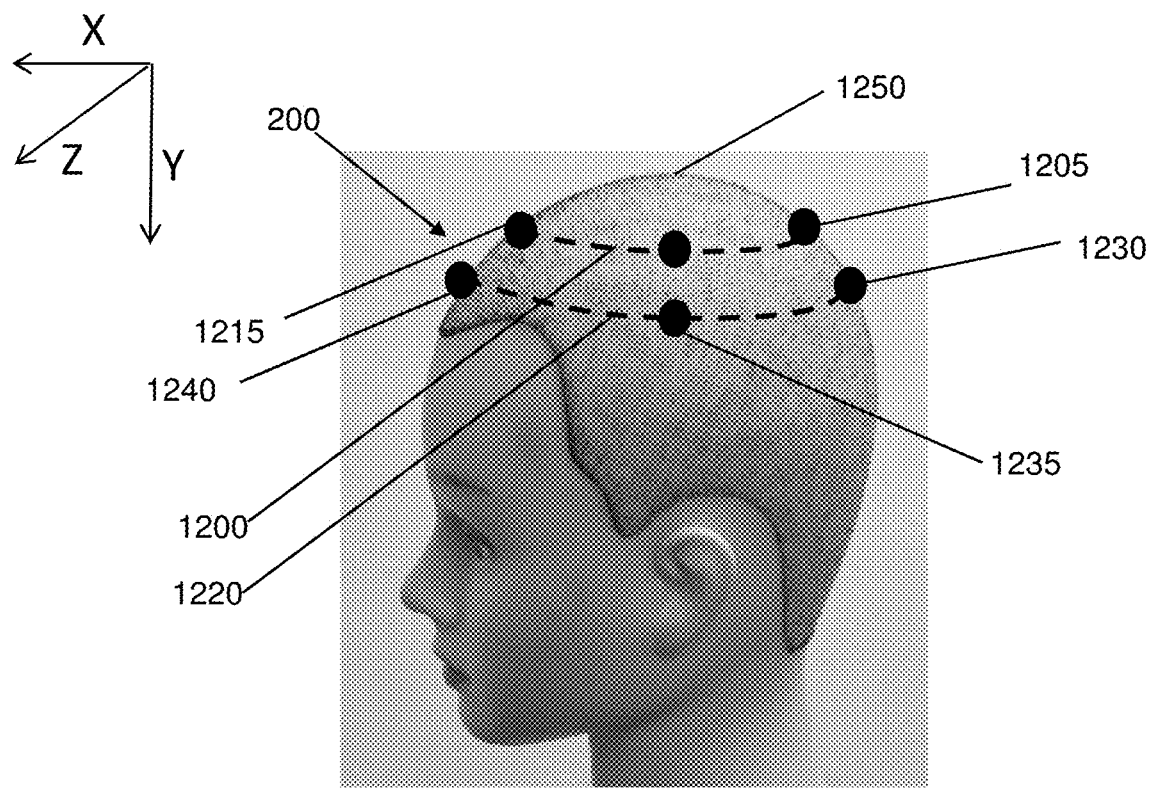
FIGS. 12a and 12b illustrate an example of yet another implementation of a methodology for generating a 3D representation of a top dome portion of a head.
Figure 12B:
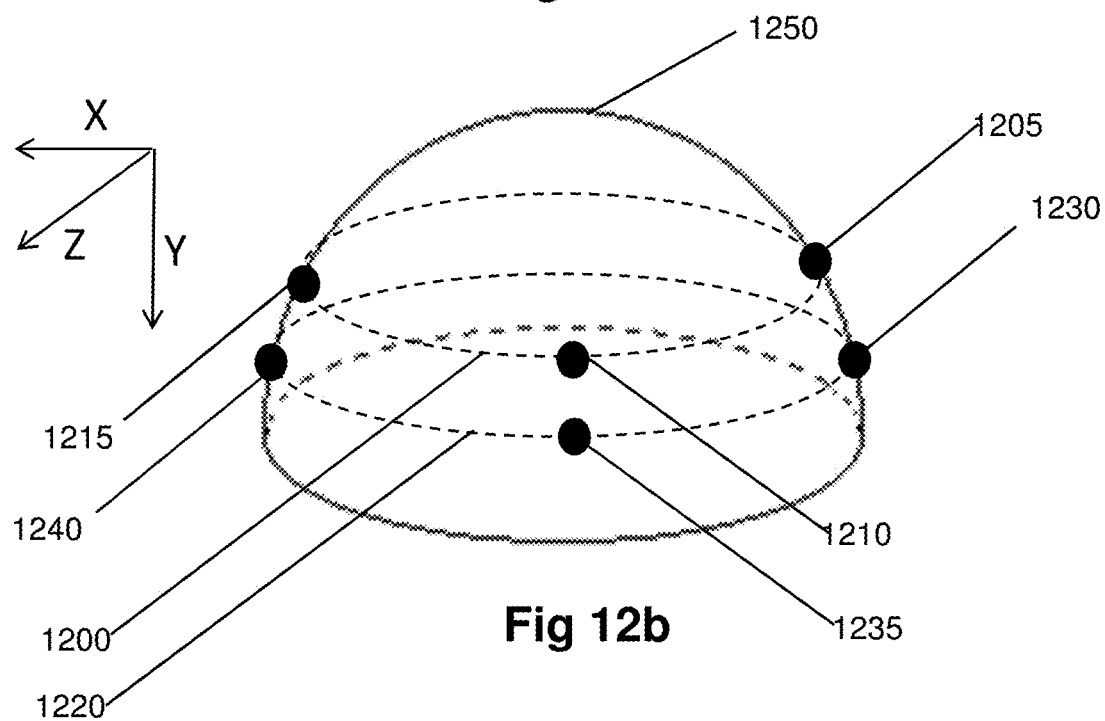

It will be apparent to those skilled in the art that there are numerous other ways in which one may either create from the beginning a 3D representation of a top dome portion of a subject's head or start with a generic 3D representation of the generic head and adjust it based on the one or more 2D images of a particular subject. One such example is illustrated in FIGS. 12*a* and 12*b*. FIG. 12*a* illustrates a side view image of the subject's head. Though only one view (a side view) is illustrated, the same methodology may equally be applied to other views, and the data acquired from the additional views may be utilized in conjunction with the data acquired from the image illustrated in FIG. 12*a* to generate the 3D representation of a top dome portion of the subject's head 200 shown in FIG. 12*b*. In this particular example, a series of data points may be selected from the side view image. A first set of data points (1205, 1210, 1215) which lie along a curve 1200 may be acquired from the patient's head 200, each of the data points comprising 3D information (for example an [x, y, z] location or coordinates) and located on substantially the same horizontal plane, that is, located at substantially the same distance in the Y direction from the top 1250 of the subject's head. In other words, a first set of data points represents a horizontal plane or a slice taken at a first distance from the top 1250 of the head. A second set of data points (1230, 1235, 1240), which lie along a curve 1220, may also be acquired, each of the data points comprising 3D information (for example an [x, y, z] location) and located on substantially the same horizontal plane at a different distance in the Y direction from the top 1250 of the subject's head. Though only two sets of data points or curves 1200, 1220 are illustrated, it will be apparent that acquisition of further sets of data points will enable a more accurate 3D representation of the top dome portion of the subject's head to be generated. Having acquired numerous sets of data, the location of each of the data points, and their distance in the Y direction can be combined to generate a 3D representation, such as that illustrated in FIG. 12*b*. The height H of the dome will be determined by the location of the lowest set of data points acquired, and as described earlier, the height H should be selected such that the lowest set of the data points are located above the level of the eyebrows. The top most point will be determined by the location of the top-most Y location on the subject's head 1250 as seen in FIG. 12*a*. In this manner, modeling of the pronounced curves or angles and complex anatomical features, such as nose, eyes, eyebrows, curves of the cheeks or a chin are avoided, and valuable processing time and costs are minimized. In some embodiments the location of the data points may be acquired automatically, such as the system may be configured to determine points from a predetermined distance H from the top of the patient's head 200, and to acquire data from predetermined Y-planes throughout the top dome portion of the subject's head. In other embodiments, the location of the data points may be selected by the user, using any of the various appropriate techniques, for example, by a point and click action to extract the data required, a technique that is known to those skilled in the art.

Though the methodologies described above in reference to certain figures provide for extraction of data from the front, side and top images, it will be apparent that in some embodiments only two such 2D images may be utilized to generate a 3D representation of the top dome portion of the subject's head 200. For example, in some embodiments only the top view and the side view (such as those of FIGS. 2 and 5) may be utilized to generate the 3D representation of the top dome portion of the subject's head 200. In other embodiments, only the top view and the front view (such as those of FIGS. 2 and 3) may be utilized to generate the 3D representation of the top dome portion of the subject's head 200. To facilitate the use of only two images to generate the 3D representation of the top dome portion of the subject's head 200, it may be necessary to make certain assumptions, or utilize data from one or both of the two images to fill in any data "gaps". In one embodiment, for example, the shape of the curve 350 may also be utilized as the shape of the curve 320, even though no such curve is ever identified on a front image. In another embodiment, an assumption may be made that a front view (even though not utilized) would comprise a symmetrical outline, and a generic symmetrical outline be generated.

In a further embodiment according to an additional aspect of the present disclosure, the 3D representation of the top dome portion of the subject's head 200 may be generated utilizing a single image, for example the top image. This embodiment may be implemented in various ways. In one such example, as described with respect to FIG. 11*a*, a generic 3D representation of a partial dome having a generic height Hg may be used. Since the generic height Hg may be accurately determined as described in reference to previous embodiments (e.g., based on the statistical or historic data), this Hg parameter of the 3D representation may be used without further adjustments, and such partial generic 3D representation may be further adjusted based only on one top view 2D image of a particular subject. The contour 300 of such top view 2D image may be extracted, for example, as described below or elsewhere in this disclosure in reference to other embodiments. As a result, a 3D representation of a partial dome portion may be created using only one view 2D image.

The top view 2D image may be projected onto the top surface of the 3D representation 1100 or the top view image may be transformed such that it conforms to the surface of the 3D representation of the top dome portion of the head as further described below or elsewhere in the present disclosure. In some embodiments, the 3D representation may be tessellated prior to projection of the 2D image onto its upper surface. In another embodiment of the disclosure, Hg may be estimated based on the top view 2D image, using for example a depth camera, such as a time-of-flight camera or structured light depth camera, which is able to determine distance by measuring the time-of-flight of a light signal between the camera and the subject for each point of the image.

To facilitate this particular implementation, an outline 300 would still need to be identified (FIG. 2), by any appropriate means, including but not limited to tracing by the user or at least partially automatically, for example, using known image processing techniques. Once the outline 300 has been determined, the area bound by the outline 300, in this example the area 220 comprising hair may be tessellated (tiled) in a pattern of geometrical shapes which do not overlap, and with no holes in the pattern, for example, as described above in reference to the methodology of FIG. 1. In this manner, processing power and processing time may be substantially reduced, requiring the rendering of fewer 2D images to generate a 3D representation of the top dome portion of the subject's head.

As stated above, FIG. 11*d-h* illustrate various additional examples of how the adjustments of the generic dome 1120 may be implemented in the methodologies of the present disclosure. As seen in FIG. 11*d*, a generic dome 1120 comprises a base having a contour 1122 and the highest point at the top of the generic dome identified as 1124. If the size of the contour of the base 1122 of the generic dome 1120 was adjusted (e.g. reduced) based on the obtained 2D image (for example, the top image), but the generic height Hg of the generic dome was not adjusted, this may result in a rather strange looking unrealistic representation of the top of the head of a patient. This is illustrated in FIG. 11*e*, where the adjusted dome 1126 is represented by the substantially reduced adjusted contour of the base 1128 but the same unadjusted highest point 1124. To avoid such inaccurate representation as shown in FIG. 11*e*, in some embodiments according to present disclosure, the generic height Hg is adjusted by a scaling factor. Such scaling factor may be determined, for example, from a parameter of the contour 1126 of the adjusted base 1128. Such parameter may be derived from the 2D image, such as the top image of the patient's head. In some embodiments, a constant scaling factor may be applied to all parts of the generic 3D model. In other embodiments, variable scaling factor may be utilized, such variable scaling factor will differ in value depending on a specific region of the person's head (or portion of the head), such as the scaling factor may vary for the front portion, back portion, or a top portion of the dome versus a lower portion of the dome portion. The scaling factor values may also vary in different coordinate directions, such as the x, y and z coordinate directions.

Referring now to FIG. 11*f*, that shows the top 2D view of the head of a person, the front portion of the head is identified as 1146 while the back portion is identified as 1144, and the topmost point of the head is identified as 1140. It has been noted that typically, the front portion 1146 comprises a more gradual slope than the back portion 144 of the head. Therefore, applying a variable scaling factor to the front and the back portions, will account for the inherent differences in curvature and result in a more accurate 3D representation. In some embodiments, the scaling factor may be based on an aspect ratio at one of more points 1130, 1132 located on the contour of the 2D image of the top of the person's head, as seen in FIG. 11*f*. For example, in reference to the point 132, it is located within a distance 1134 from a center of person's head 1140 and within a distance 1138 from the centerline 1142. The center 1140 of the person's head, for example, may correspond to a center of a contour of the image, a location of the topmost point of the person's head projected onto the 2D image of the patient's head, or the location of a physical center point. The aspect ratio may comprise the ratio of a distance 1134 relative to a distance 1138.

According to further examples, the aspect ratio may be determined relative to one or more points on the surface of the 3D dome. This example is illustrated in reference to FIG. 11*g*. When adjusting the generic 3D dome representation to create a desired 3D dome representation, the rate at which the dome's surface varies may differ from the base of the dome (for example at locations 1158 and 1159) to the topmost point (1154). In such example, the adjustment or scaling of the generic 3D dome representation at the Y=0 locations will be zero, since the locations in the Y=0 plane, the base of the dome, will be derived directly from the 2D image data. However the adjustment value required to be made at the Y=max height, at vertex 1154 will be a maximum adjustment value. For example, the point referenced as 1150 in FIG. 11*g* may be used to determine the adjustment required at one or more neighboring locations, rather than the point referenced as 1158. The point 1150 is disposed a distance y in Y direction, and the aspect ratio at the point 1150 may be determined, for example, by determining the ratio between a distance from the point 1150 to an axis 1152 (along the direction -D to D) and a distance from the topmost location of the head 1154 to the center 1156 of the base of the dome, divided by the distance from the center 1156 to a point 1158 (a point disposed at Y=0, on the base contour), which has been previously derived from the 2D image.

Figure 11H:
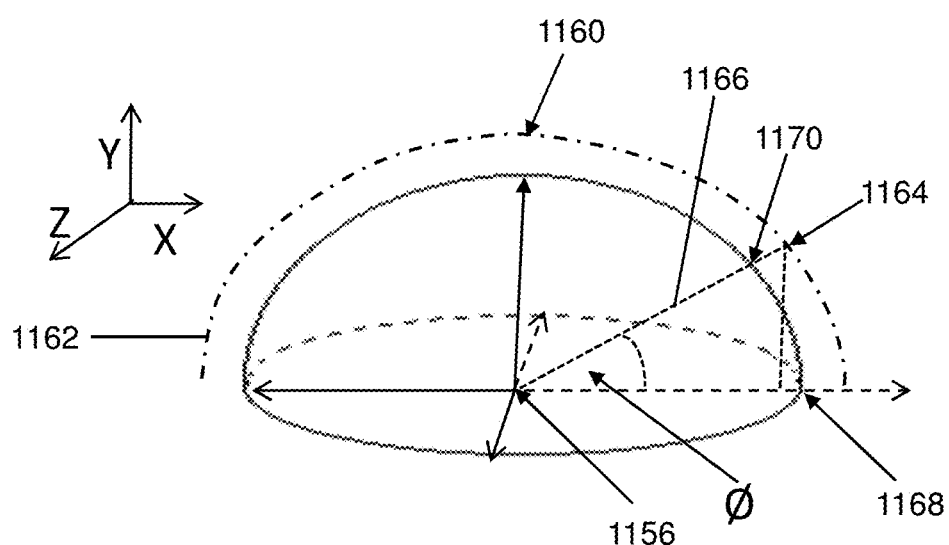

In yet another embodiment, as shown in FIG. 11*h*, generic dome 1162 has a topmost point 1160. From the 2D top image of the patient's head an adjusted point 1168 may be determined. Determining the scaling factors for adjusting or carving the surface of a generic 3D dome 1162 to represent a realistic head shape and identifying the accurate adjusted location for the point 1164 of the generic dome 1162 may comprise, for example, a) drawing a virtual line 1166 from projecting a location of a point (1164) to the center 1156 of the base of the generic 3D dome 1162;
b) projecting a location of the point (1164) onto a selected plane (x-z plane);
c) determining an angle Ø between the projected virtual line 1166 and the selected x-z plane; and
d) determining a scaling factor or adjustment based on the determined angle Ø.

In one embodiment the factor may comprise the value of the cosine of the angle Ø. In this manner, for point 1168, for example, the value of the cosine of the angle Ø will be 1, no additional adjustment of the generic 3D dome is required, the value determined from the 2D image can be utilized for the Y=0 position. For point 1164, the cosine of the angle Ø will be less than 1, and therefore all dome representation vertices in the region of the location 1164 will be adjusted, moving them inwards toward point 1156, the (0,0,0) location, to a new adjusted location 1170. This procedure may be repeated for each point on the surface of the generic 3D dome, until the topmost point 1160 is reached. At this location, all model vertices will be scaled by moving inwards to the (0,0,0) location. It will be appreciated that any angle other than the angle Ø may be utilized to determine the scaling factor by using trigonometric formulae known to those skilled in the art.

Another example of an adjustment technique may comprise converting a contour line of the 2D top image into a number of planes on the generic dome, each of which represents how far a particular contour vertex extends away from the center of the contour line. In this particular case, the D value of each plane would correspond to the distance the contour vertex extends from the contour center in the direction of the contour vertex. In this manner, adjustment of each individual vertex is accomplished by multiplying the D value of each plane by the scaling value (e.g, as described above). Adjustment of the generic dome is then accomplished by iterating over all these planes. If the vertex is outside the boundary described by these modified planes, the vertex is adjusted.

Therefore, as shown by way of non-limiting examples described above, the surface of a generic 3D representation of the dome can be adjusted, reducing or enlarging the base of the dome, increasing or decreasing the height of the dome structure, and/or adjusting the location of vertices on the surface of the dome, as dictated, for example, by the contour of the 2D image of the top of the head.

In accordance with various embodiments of the disclosure, a system for generating a 3D representation of the top dome portion of the subject's head may comprise a user interface, one or more processors (e.g., software-controlled), a monitor (e.g., a touch screen), and at least one input device. The system may comprise a stand-alone (e.g., "personal") computer system or it may employ a centralized server with multiple remote terminal(s). It will be appreciated that embodiments of the systems of the present disclosure may be software implemented and may be run on any computer system having the basic components (processor, monitor, input device), so long as such computer system is equipped with sufficient available memory and an appropriate graphic generation and display capability. The computing system may include one or more processing units, one or more non-transitory storage media (which may take the form of, but is not limited to, a magnetic storage medium; optical storage medium; magneto-optical storage medium; read only memory; random access memory; erasable programmable memory; flash memory; and so on), and/or one or more input and/or output components for transmitting output to and/or receiving input from one or more other components (such as one or more displays, touch screens, keyboards, mice, track pads, track balls, styluses, pens, printers, speakers, cameras, video cameras, and so on). The processing unit may comprise one or more modules to execute instructions stored in the storage medium in order to perform one or more described functions, such as generating one or more 3D representations or treatment planning methods. The system or the processing unit may additionally include an image repository, the image repository comprising templates, images of one or more patients and/or images of portions of templates or patients. The system can be configured to implement all the methodologies, processes and techniques described herein. In another embodiment of the disclosure, the modules may be executed to run on handheld devices, for example mobile phones, smart phone, or other such devices, which are also able to capture images of the body surface, taking the form of an disclosure to downloaded onto the phone by the user. The system may include one or more imaging device, for example one or more cameras, such as any commercially available cameras. Of course, various imaging devices or a combination of several devices could be used with any of the embodiments of the systems and methods described herein. The imaging device may comprise a device that takes still images, it can also comprise a device capable of real time imaging (e.g., webcam capable of continuously streaming real time information), and/or it could also have a video recording capability (such as a camcorder). While stereo or multi-view imaging devices are very useful in the present invention, it is not necessary to employ such geometries or configurations, and the present invention is not so limited. Likewise, although it is preferred that the image acquisition device be a digital device, it is not necessary. For example, the image acquisition device could be an analog TV camera that acquires an initial image which is then processed into a digital image (for example, via an analog-to-digital device like a commercial-off-the-shelf frame grabber) for further use in the method of the present invention. The imaging device may be held, for example, by a robotic arm, or by any other mechanism or means. The imaging device may be coupled to a processing system to control the imaging operation and process image data.

Although while it may be suggested that the system or computing system of the present disclosure may include particular components arranged in a particular configuration, it is understood that this is for the purposes of example. In various implementations, the system may include any number of components (such as one or more busses, displays, networking components, dedicated image processors, co-processors, memories, hard drives, ports, graphics adapters, and so on) arranged in different configurations without departing from the scope of the present disclosure. For example, in one or more implementations the computing system may include multiple cameras and/or video cameras arranged to capture images and/or video of the same scene. By way of another example, in various implementations the computing system may include one or more interfaces for controlling machinery such as automated and/or computer-assisted surgical machinery. In certain implementations, the system according to the present disclosure may includes one or more processors configured to execute machine-readable instructions; a memory for storing machine-readable instructions; an input/output interface connected to the one or more processors to allow a user to interact with the system, wherein the input/output interface includes a display; and wherein the one or more processors are connected to the memory to execute the machine-readable instructions comprising the steps for implementing the methodologies described herein in reference to FIGS. 1-12.

It will also be appreciated that embodiments of the disclosure may be implemented over the internet, e.g., with a user of such system employing his or her home computer as at least a part of the user interface (monitor and input device) that interacts with a remote server or computer. In such an internet-based planning system, the software that implements and controls the user interface may reside in whole or part on the user's computer or on the remote server/computer, preferably transparent to the user. In one such embodiment, the remote server downloads one or more software modules to the user's computer for temporary or permanent use.

It is to be understood that other embodiments than those described above may be utilized and structural or logical changes may be made without departing from the scope of the present disclosure. The Detailed Description, therefore, is not to be taken in a limiting sense, and the scope of the present disclosure is defined by the appended claims. It will also be apparent that although the methodology described above as discrete steps, one or more steps may be combined or even deleted, without departing from the intended functionality of the embodiments of the disclosure. It will also be apparent that the methods described above may be performed manually, or they may be partially or substantially automated, including performed using robotic systems.

It will also be appreciated that the foregoing illustrated and described embodiments of the disclosure are susceptible to various modifications and alternative forms, and it should be understood that the disclosures as generally disclosed herein, as well as the specific embodiments described herein, are not limited to the particular forms or methods disclosed, and that many other embodiments are possible within the spirit and the scope of the present disclosures. Moreover, although individual features of one embodiment may be discussed herein or shown in the drawings of the one embodiment and not in other embodiments, it should be apparent that individual features of one embodiment may be combined with one or more features of another embodiment or features from a plurality of embodiments. By way of non-limiting example, it will be appreciated by those skilled in the art that particular features or characteristics described in reference to one figure or embodiment may be combined as suitable with features or characteristics described in another figure or embodiment. Applicant regards the subject matter of the disclosure to include all combinations and sub-combinations of the various steps, elements, features, functions, and/or properties disclosed herein.

What is claimed is:

1. A method for generating a 3D representation of a portion of a head, the method comprising:
   determining a height dimension H from a 2D image of a front or a side of a head of a person, the height dimension H corresponding to a distance from a top of the head in the 2D image to a location approximately at or above a level of an eyebrow;
   extracting data from the 2D image of the front or the side of the head of the person within the height dimension H and from at least one top view 2D image of the head, the top view 2D image of the head including portions of the head with hair and portions of the head without hair, the data extracted from the at least one top view 2D image of the head comprising a contour of the shape of the top of the head excluding the nose;
   creating a 3D dome representation of the portion of the head based on the height dimension H and the extracted data from the 2D images; and
   projecting the extracted data from the 2D top view image of the head, including portions of the head with hair and portions of the head without hair but excluding the nose, onto the 3D dome representation of the portion of the head.

2. The method of claim 1, wherein the height dimension H is less than or equal to approximately 7 cm, or within a range between 6 and 12 cm.

3. The method of claim 1, wherein the step of extracting data from the 2D image comprises extracting data or information about one or more of: a contour of the top 2D image of the head, an open-loop curve of the front 2D image of the head, an open-loop curve of the side 2D image of the head, or any combination of the above.

4. The method of claim 1, wherein the step of extracting data from the 2D image comprises extracting data or information about one or more dimensions of the respective top view 2D image, a top portion of the front view 2D image or a top portion of the side view 2D image of the head, or any combination of the above.

5. The method of claim 1, wherein creating the 3D dome representation comprises adjusting a generic 3D representation of a generic head or a portion of the generic head based on the extracted data.

6. The method of claim 5, wherein the generic 3D representation of the generic head or the portion of the generic head comprises approximately half a sphere or a generic dome having a generic height Hg.

7. The method of claim 6, wherein the generic height Hg is based on a historic or statistical data.

8. The method of claim 5, wherein the generic 3D representation of the generic head or the portion of the generic head is selected from a collection of templates.

9. The method of claim 5, wherein the adjusting step comprises normalizing the generic 3D representation to correspond to a contour of the 2D top view image of the head.

10. The method of claim 5, wherein the adjusting step comprises one or more of scaling, translating or rotating of the generic 3D representation.

11. The method of claim 1, wherein the height dimension H is determined such that data is extracted from portions of the head above the eyebrows that do not have a pronounced curvature or a sharp directional change.

12. The method of claim 1, wherein the extracting data step comprises using a touch screen to trace one or more contours or open-loop curves of any one or more of the front, the side or the top 2D images.

13. The method of claim 1, wherein the extracting data step is performed automatically using an image processor.

14. The method of claim 1, comprising using the created 3D dome representation for planning or performing hair harvesting, hair implantation, site making, hair loss treatment, or hair tattooing procedure.

15. The method of claim 1, further comprising simulating hair implantation sites or hair follicles.

16. A method for generating a 3D representation of a top dome portion of a head, the method comprising:
    determining a height dimension (H) from a 2D image of a front or a side of a head of a person, the height dimension H corresponding to a distance from a top of the head in the 2D image to a location at or above a level of an eyebrow;
    extracting data from the 2D image of the front or the side of the head of the person and from at least one more 2D image of a different view of the head of the person;
    adjusting a 3D representation of a generic head or at least a top portion of a generic head to create a 3D dome representing a top portion of the head of the person based on: a) the height dimension H and b) extracted data from the 2D image of the front or the side of the head of the person and from the at least one more 2D image of the different view of the head of the person; and
    projecting extracted data from a 2D top view image of the head, including portions of the head with hair and portions of the head without hair but excluding the nose, onto the 3D dome representation of the top portion of the head.

17. The method of claim 16, wherein the at least one more 2D image is a top view image of the head of the person.

18. The method of claim 16, wherein adjusting the 3D representation of the generic head or the at least top portion of the generic head is based on three 2D images of the head of the person, the three images comprising a top view, the front view and the side view.

19. The method of claim 17, further comprising tessellating the top view 2D image of the head of the person and deforming it to conform to a top surface of the adjusted 3D representation.

20. The method of claim 16, wherein the extracting data step comprises tracing one or more contours or open-loop curves of any one or more of the front, the side or the 2D image of a different view to identify a particular orientation of the head of the person.

21. A method for generating a 3D representation of a top dome portion of a head, the method comprising:
    extracting data from a contour or a 2D image of a top view of a head of a person, and extracted data excluding the nose; and adjusting a generic 3D representation of a generic head or at least a top portion of the generic head to create an adjusted 3D dome representing a top portion of the head of the person wherein the adjusting is based on: a) the extracted data from the contour of the 2D image of the top view of the head of the person, and b) a scaling factor derived at least in part from the extracted data from the contour of the 2D image, and wherein the scaling factor is applied to adjust a generic height dimension to reflect a distance from a top of the head in the 2D image to a location at or above a level of an eyebrow; and projecting the extracted data from the 2D image of the top view of the head, including portions of the head with hair and portions of the head without hair but excluding the nose, onto the adjusted 3D dome representing a top portion of the head.

22. The method of claim 21, wherein the scaling factor comprises an aspect ratio.

23. The method of claim 21, wherein the scaling factor is constant.

24. The method of claim 21, wherein the scaling factor is variable depending on a region of the 3D dome or a direction of a coordinate system.

25. The method of claim 21, wherein the extracting data step comprises tracing one or more contours or open-loop curves of any one or more of the 2D image of the top view, a front view or a side view to identify a particular orientation of the head of the person.

26. A system for generating a 3D representation of a portion of a head, the system comprising:

at least one non-transitory storage medium storing instructions and one or more modules for executing operations on image data, the one or more modules comprising instructions for:

determining a height dimension H from a 2D image of a front or a side of a head of a person, the height dimension H corresponding to a distance from a top of the head in the 2D image to a location approximately at or above a level of an eyebrow;

extracting data from the 2D image of the front or the side of the head of the person within the height dimension H and from at least one top view 2D image of the head, the top view 2D image of the head including portions of the head with hair and portions of the head without hair, the data extracted from the at least one top view 2D image of the head comprising a contour of the shape of the top of the head excluding the nose;

creating a 3D dome representation of the portion of the head based on the height dimension H and the extracted data from the 2D images; and projecting the extracted data from top view 2D image of the head, including portions of the head with hair and portions of the head without hair but excluding the nose, onto the 3D dome representation of the portion of the head.

27. A system for generating a 3D representation of a top dome portion of a head, the system comprising:

at least one non-transitory storage medium storing instructions, and one or more modules for executing operations on image data, the one or more modules comprising instructions for:

extracting data from a contour or a 2D image of a top view of a head of a person, the 2D image of the top view of the head including portions of the head with hair and portions of the head without hair; and adjusting a generic 3D representation of a generic head or at least a top portion of the generic head to create an adjusted 3D dome representing a top portion of the head of the person based on: a) extracted data from the contour of the 2D image of the top view of the head of the person, the contour of the 2D image of the top view of the head excluding the nose, and b) a scaling factor derived at least in part from the extracted data from the contour of the 2D image, wherein the scaling factor is applied to adjust a generic height dimension to reflect a distance from a top of the head in the 2D image to a location at or above a level of an eyebrow; and projecting the extracted data of the 2D image of the top view of the head, including portions of the head with hair and portions of the head without hair but excluding the nose, onto the adjusted 3D dome representing a top portion of the head.

* * * * *